US008864022B2

(12) United States Patent
Hernandez

(10) Patent No.: US 8,864,022 B2
(45) Date of Patent: Oct. 21, 2014

(54) AUTHENTICATION STRATEGIES FOR REMOTE FINANCIAL INSTITUTION SERVICES

(75) Inventor: Ray R. Hernandez, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 409 days.

(21) Appl. No.: 13/111,349

(22) Filed: May 19, 2011

(65) Prior Publication Data
US 2012/0292388 A1    Nov. 22, 2012

(51) Int. Cl.
G06K 7/00 (2006.01)
G06Q 20/10 (2012.01)
G06Q 20/32 (2012.01)
G06Q 20/34 (2012.01)

(52) U.S. Cl.
CPC .......... *G06Q 20/108* (2013.01); *G06Q 20/3221* (2013.01); *G06Q 20/3223* (2013.01); *G06Q 20/3276* (2013.01); *G06Q 20/34* (2013.01)
USPC ............................. 235/379; 235/375; 235/380

(58) Field of Classification Search
USPC .......................................... 235/375, 379, 380
See application file for complete search history.

(56) References Cited

U.S. PATENT DOCUMENTS

| | | | |
|---|---|---|---|
| 2005/0080731 A1 | 4/2005 | Dnyaneshwar | |
| 2005/0097046 A1 | 5/2005 | Singfield | |
| 2005/0232471 A1* | 10/2005 | Baer | 382/115 |
| 2006/0131389 A1* | 6/2006 | Kwon | 235/380 |
| 2006/0226215 A1* | 10/2006 | Yu et al. | 235/379 |
| 2008/0189420 A1* | 8/2008 | Herrod et al. | 709/227 |
| 2009/0200374 A1* | 8/2009 | Jentoft | 235/382 |
| 2011/0035240 A1* | 2/2011 | Joao | 705/4 |

OTHER PUBLICATIONS

Related U.S. Appl. No. 13/005,331 entitled "Automatic Image Analysis and Capture", filed Jan. 12, 2011.
Related U.S. Appl. No. 13/083,310 entitled "Virtual ATM", filed Apr. 8, 2011.
Related U.S. Appl. No. 13/083,325 entitled "Dynamic Pre-Qualification", filed Apr. 8, 2011.
www.usaa.com/inet/pages/deposit_at_mobile_main. (1 page total) downloaded Apr. 14, 2011.
Swartz, Kathryn: "Chase iPhone App Launches Support for Mobile Deposits" (3 pages total); http://www.appolicious.com/finance/articles/2259-chase-iphone-app-launches-support-for-mobile-deposits; downloaded Apr. 14, 2011.

* cited by examiner

*Primary Examiner* — Matthew Mikels
(74) *Attorney, Agent, or Firm* — Moore and Van Allen, PLLC; Michael A. Springs; Sreenivas Vedantam

(57) ABSTRACT

Embodiments of the invention are directed to systems, methods and computer program products for authenticating access to a financial institution service. In some embodiments, a method includes: (a) receiving a user input configured to request access to a financial institution service, and (b) initiating presentation of, using a processor, a first authentication request in an electronic banking environment, wherein the first authentication request prompts a user to initiate capture of an image of a capturable authentication card associated with the account holder. In some embodiments, the method further includes receiving the image of the capturable authentication card, and determining the capturable authentication card is a valid capturable authentication card based at least partially on information extracted from the image of the capturable authentication card. The invention allows a user to enjoy a similar authentication experience prior to accessing a financial institution service at a physical ATM when compared to accessing an electronic financial institution service via an image capture device such as a mobile computing device.

19 Claims, 11 Drawing Sheets

AUTHENTICATION STRATEGIES FOR REMOTE FINANCIAL INSTITUTION SERVICES

BACKGROUND

Traditional authentication strategies include authenticating an account holder into an electronic account (e.g., electronic banking account) held at a server maintained by a network entity by prompting the account holder to input a predetermined password, and/or a dynamic one-time password, and/or predetermined answers to one or more questions, etc., into a computing device that is connected to a network. Anybody other than the account holder who gains access to these passwords or answers may be able to access the account holder's account and make fraudulent transactions associated with the account holder's account. Therefore, there is a need for entities that have a presence on networks such as the Internet to find new mechanisms to authenticate account holders into their accounts.

In order to access a banking account at a physical automated teller machine (ATM), an account holder is usually required to: 1) insert an ATM card into the machine, and 2) input a passcode associated with the ATM card. There is a need to replicate this ATM authentication process at non-ATM locations (e.g., mobile computing devices) so that: 1) financial institutions can use a single back-end authentication system for authenticating account holders into their accounts, and 2) users can enjoy a similar authentication experience regardless of the mode (e.g., online banking, mobile banking, etc.) of accessing their accounts.

BRIEF SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

In order to access a banking account at a physical automated teller machine (ATM), an account holder is usually required to 1) insert an ATM card into the machine, and 2) input a passcode associated with the ATM card. Embodiments of the invention allow a user to enjoy a similar authentication experience when accessing, on a computing device such as a mobile computing device, an electronic banking environment (or when selecting a financial institution service option associated with the electronic banking environment). For example, when a user selects a mobile banking application on a mobile computing device, the device 1) prompts the user to initiate capture of an image of the capturable authentication card (e.g., an ATM card, a credit card, a pre-paid/stored value card, an identification card, etc.) using an image capture function associated with the mobile computing device, and 2) prompts the user to input a passcode associated with the capturable authentication card. As an alternate example, a user may authenticate into a mobile baking application by providing a authentication credentials (e.g., a username and password) associated with the mobile banking application. Subsequently, when the user selects a financial institution service option offered by the mobile banking application, the mobile computing device 1) prompts the user to initiate capture of an image of the capturable authentication card using an image capture function associated with the mobile computing device, and 2) prompts the user to input a passcode associated with the capturable authentication card.

Embodiments of the present invention address the above needs and/or achieve other advantages by providing apparatus (e.g., a system, computer program product, and/or other device), methods, or a combination of the foregoing for authenticating access to a financial institution service (e.g., a banking service). For instance, a method is provided for authenticating access to a financial institution service. In some embodiments, the method includes receiving a user input configured to request access to a financial institution service. Additionally, the method includes initiating presentation of, using a processor, a first authentication request in an electronic banking environment, wherein the first authentication request prompts a user to initiate capture of an image of a capturable authentication card associated with the account holder.

In some embodiments, the method additionally includes receiving the image of the capturable authentication card. The method additionally includes determining the capturable authentication card is a valid capturable authentication card based at least partially on information extracted from the image of the capturable authentication card. The method additionally includes, in response to determining the capturable authentication card is a valid capturable authentication card, initiating presentation of a second authentication request in the electronic banking environment, where the second authentication request prompts the user to input a passcode associated with the capturable authentication card. In some embodiments, the method additionally includes, in response to receiving the passcode and verifying that an input passcode is the correct passcode, initiating the financial transaction (e.g., banking) service in the electronic banking environment.

BRIEF DESCRIPTION OF THE DRAWINGS

Figure 1:
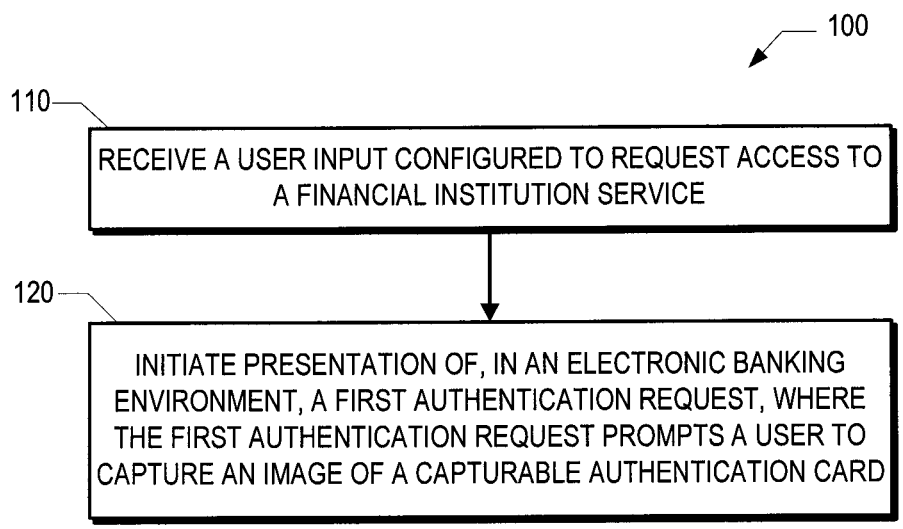
Figure 2:
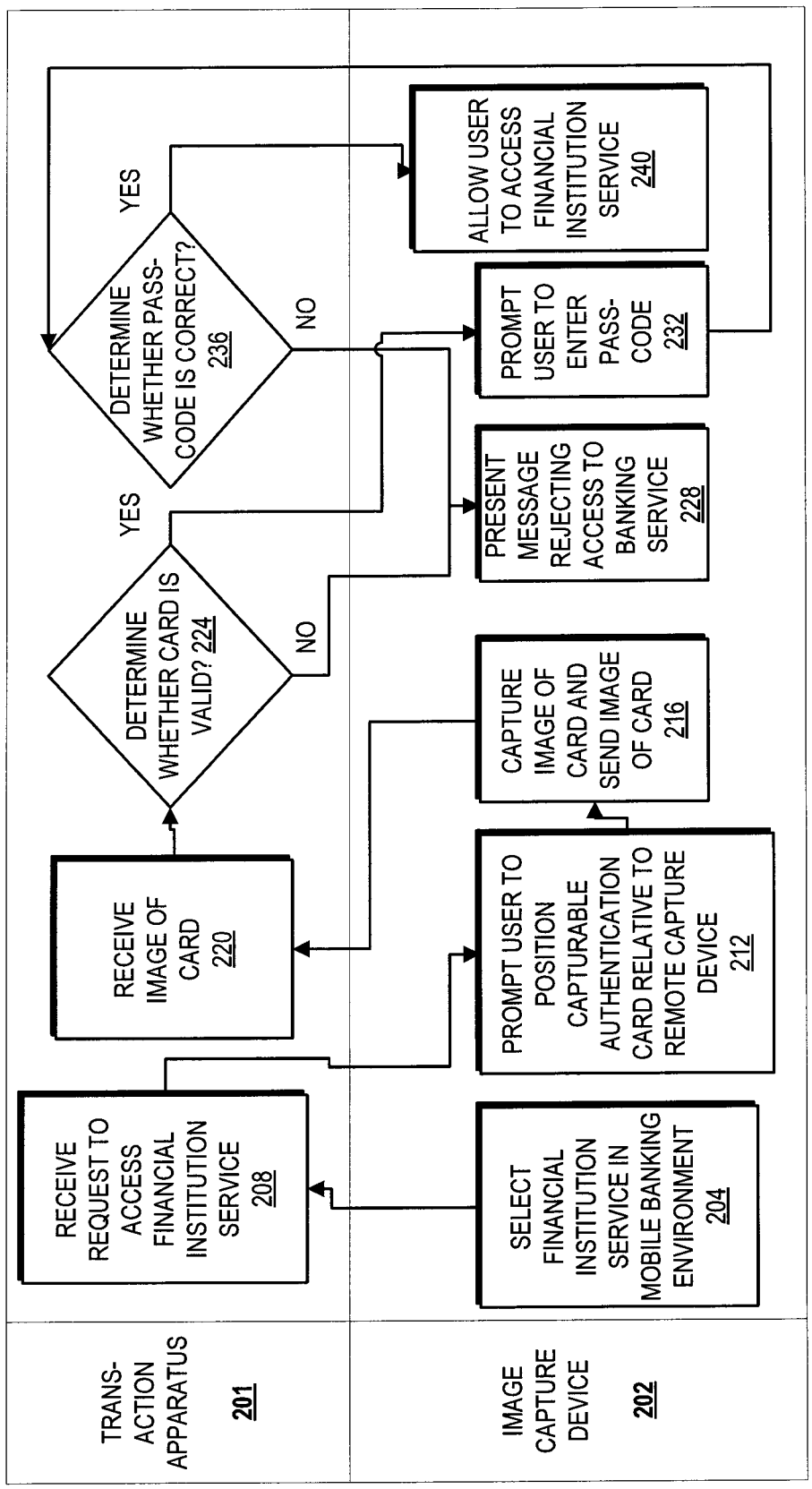
Figure 9:
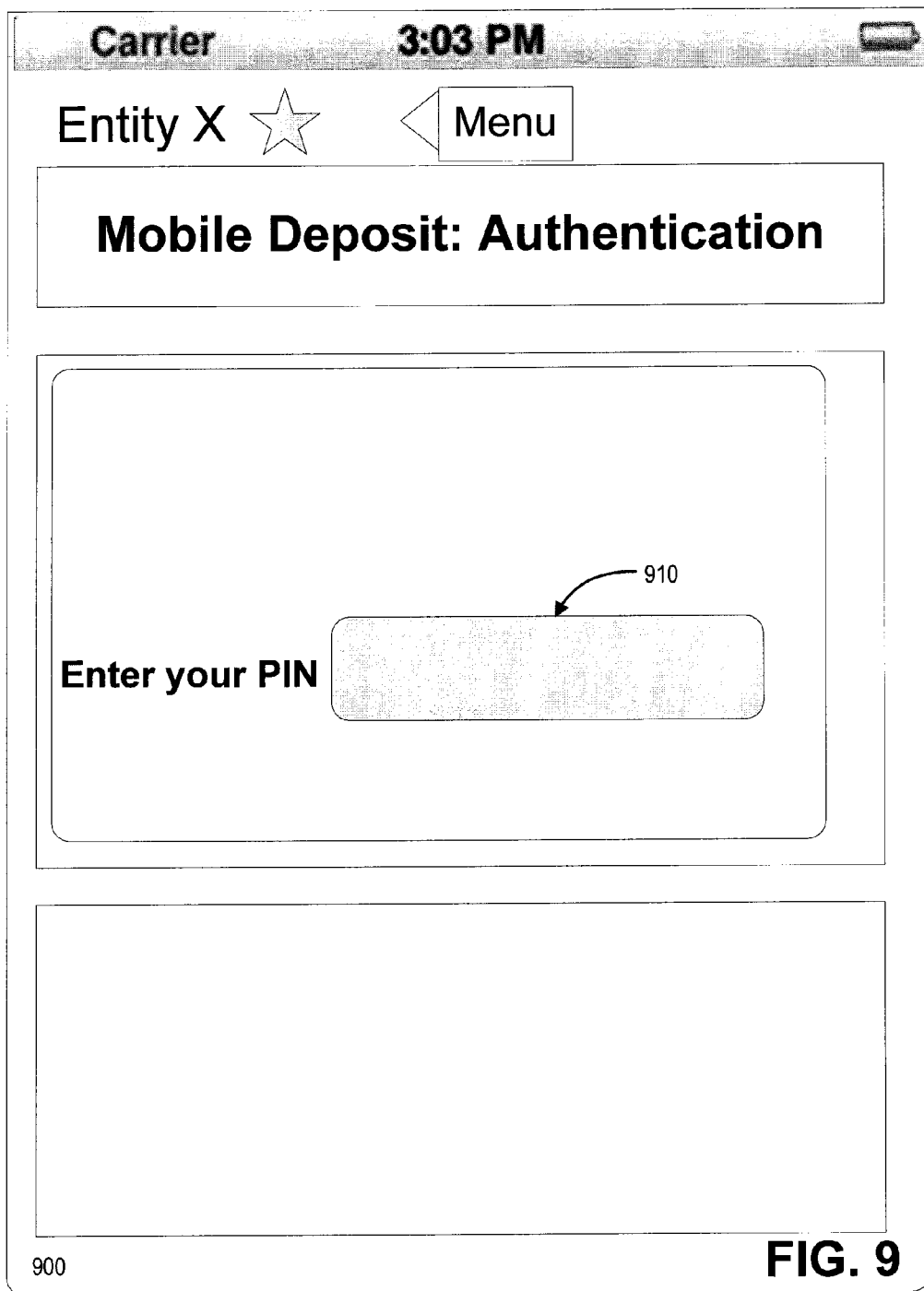
Figure 10:
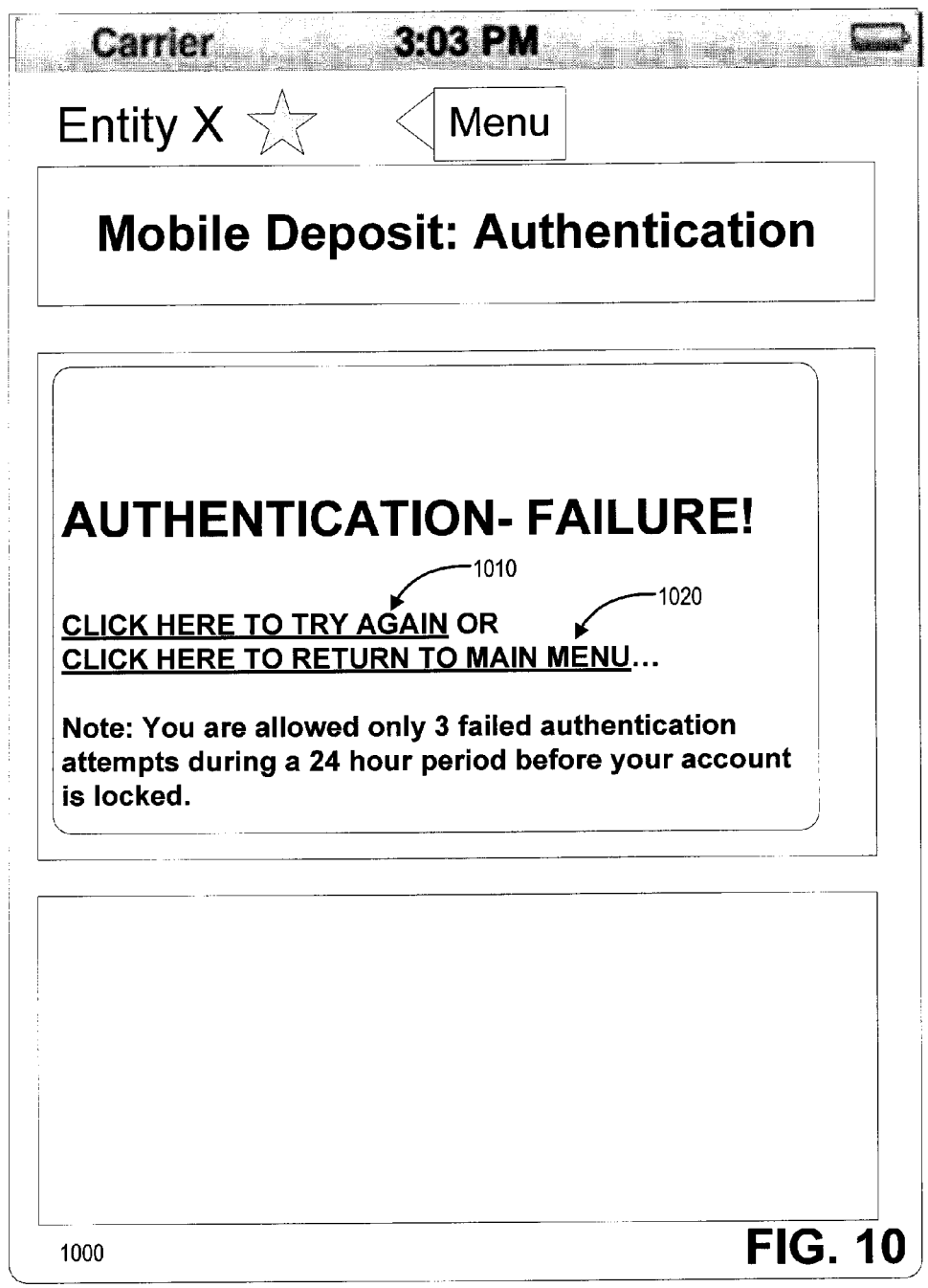
Figure 11:
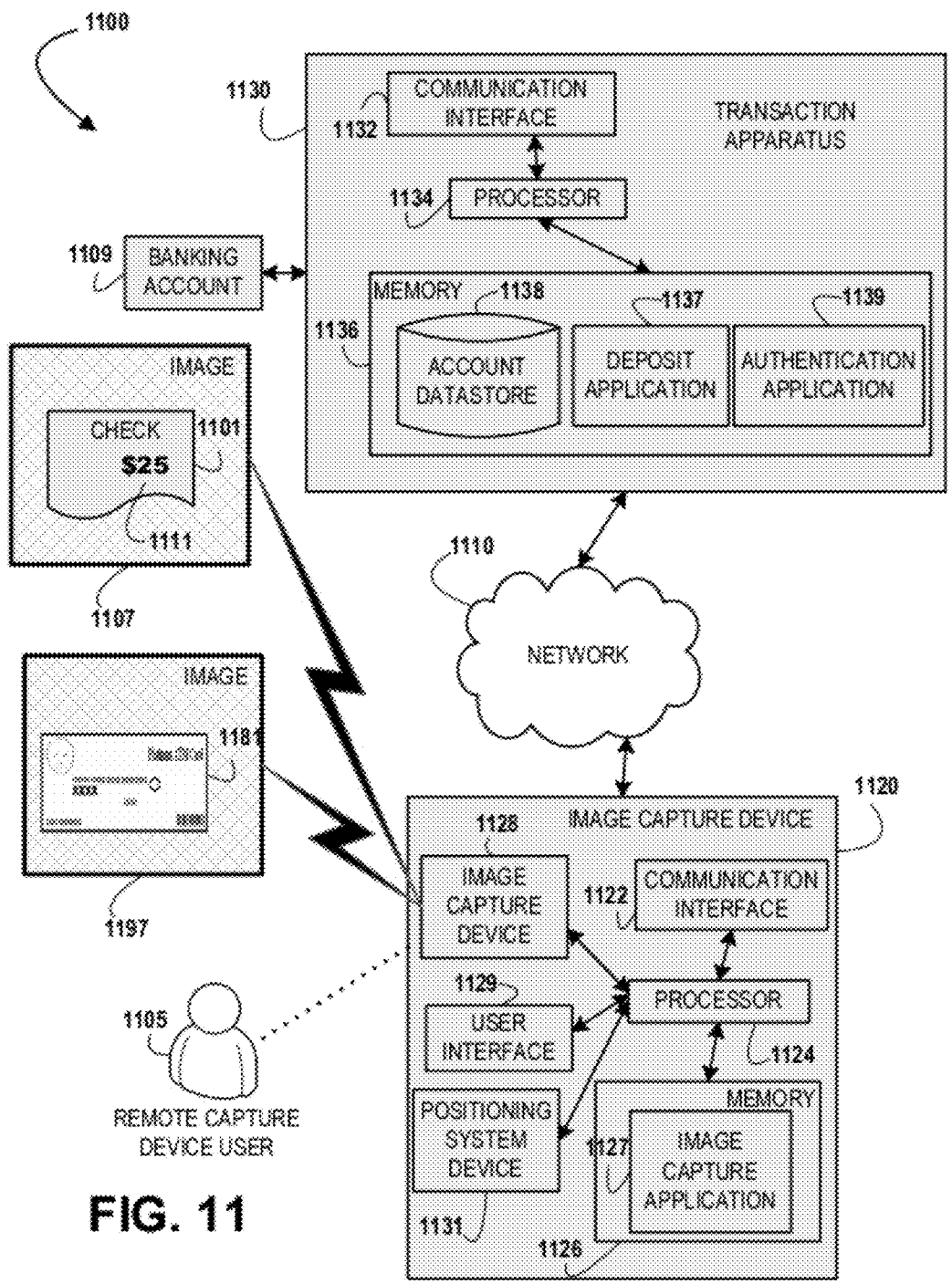

Having thus described embodiments of the invention in general terms, reference will now be made to the accompanying drawings, where:

FIG. 1 is a flowchart illustrating a general process flow for authenticating access to a financial institution service, in accordance with embodiments of the present invention;

FIG. 2 is another flowchart illustrating a general process flow for authenticating access to a financial institution service, in accordance with embodiments of the present invention;

FIGS. 3-10 are illustrations of a graphical user interface used during the processes of FIGS. 1 and 2, in accordance with embodiments of the present invention; and FIG. 11 is a block diagram illustrating technical components of a system for authenticating access to a financial institution service, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In order to access a banking account at a physical automated teller machine (ATM), an account holder is usually required to 1) insert an ATM card into the machine, and 2) input a passcode associated with the ATM card. Embodiments of the invention allow a user to enjoy a similar authentication experience when accessing, on a computing device such as a mobile computing device, an electronic banking environment or a particular financial institution service in the electronic banking environment. For example, when a user selects a mobile banking application on a mobile computing device, the device 1) prompts the user to initiate capture of an image of the capturable authentication card (e.g., an ATM card, a credit card, a pre-paid/stored value card, an identification card, etc.) using an image capture function associated with the mobile computing device, and 2) prompts the user to input a passcode associated with the capturable authentication card. As an alternate example, a user may authenticate into a mobile baking application by providing a authentication credentials (e.g., a username and password) associated with the mobile banking application. Subsequently, when the user selects a financial institution service option offered by the mobile banking application, the mobile computing device 1) prompts the user to initiate capture of an image of the capturable authentication card using an image capture function associated with the mobile computing device, and 2) prompts the user to input a passcode associated with the capturable authentication card.

As used herein, a capturable authentication card is a card that 1) may be used for purpose of authenticating a user to an account or to a service associated with the account, and 2) may be captured (e.g., photographed) by an image capture device. In some embodiments, a capturable authentication may be an automated teller machine (ATM) card (that may or may not be associated with the account), a credit or debit card (that may or may not be associated with the account), a pre-paid/stored value card (that may or may not be associated with the account), an identification card (e.g., a driver's license, an identification card issued by an employer or an educational institution, etc.). Therefore, in some embodiments, the capturable authentication card may not be issued by the financial institution that manages the account. Moreover, embodiments of a capturable authentication card are not limited to those described herein. In some embodiments, a capturable authentication card includes an authentication code on a front surface and/or a back surface of the capturable authentication card. Embodiments of the authentication code are described in further detail below.

Referring now to FIG. 1, a general process flow 100 is provided for authenticating access to a financial institution service, in accordance with embodiments of the present invention. In some embodiments, the process flow 100 is performed by an apparatus (e.g., transaction apparatus 1130 illustrated in FIG. 11, image capture device 1120, etc.) having hardware and/or software configured to perform one or more portions of the process flow 100. In such embodiments, as represented at block 110, the apparatus is configured to receive a user input configured to request access to a financial institution service. As represented at block 120, the apparatus is configured to initiate presentation of, using a processor, a first authentication request in an electronic banking environment, where the first authentication request prompts a user to initiate capture of an image of a capturable authentication card associated with the account holder (or the account).

In some embodiments, the account is associated with and/or maintained by a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. An "account" may be the relationship that an individual or a first entity such as a business organization, hereinafter referred to as the "user" or "client" or "account holder," has with a second entity, which may be a financial institution. As used herein, a "user" may be someone other than an "account holder" who operates the account's holder's account or is attempting to operate the account holder's account. For instance, this account may be a deposit account, such as a transactional account (e.g., a banking account), a savings account, an investment account, a money market account, a time deposit, a demand deposit, or a pre-paid account. This account could also be a credit account such that the account holder has a repayment or delivery obligation towards a second entity under previously agreed upon terms and conditions.

A capturable authentication card allows a user to access an account via an image capture device in order to perform one or more transactions associated with the account. In some embodiments, the first authentication request may not necessarily prompt a user to initiate capture of an image of a capturable authentication card by an image capture device. Instead, the first authentication request may prompt a user to initiate capture of an image of any card or physical object associated with a user. Therefore, for example, a user may initiate capture of a credit card associated with the user (where the credit card may or may not be associated with the account), or a driver's license or some other type of photo identification card associated with the user, etc. An apparatus may receive the image and subsequently determine, using information extracted from the image, whether the user of the image capture device is the account holder associated with the account to which the user requests access.

In some embodiments, when a user selects a mobile banking application on a mobile computing device, the device 1) prompts the user to initiate capture of an image of the capturable authentication object (which is not necessarily a card) using an image capture function associated with the mobile computing device, and 2) prompts the user to input a passcode associated with the capturable authentication object. As an alternate example, a user may authenticate into a mobile baking application by providing a authentication credentials (e.g., a username and password) associated with the mobile banking application. Subsequently, when the user selects a financial institution service option offered by the mobile banking application, the mobile computing device 1) prompts the user to initiate capture of an image of the capturable authentication object using an image capture function associated with the mobile computing device, and 2) prompts the user to input a passcode associated with the capturable authentication object. In such embodiments, for example, the user may initiate capture of a physical object associated with the user (e.g., the user's watch). As a further example, the user may initiate capture of some other feature associated with the user (e.g., a birthmark on the user's hand). In such embodiments, the user may have previously captured an image of the physical object or feature and transmitted the image via a computing device to the transaction apparatus along with an instruction that the transmitted image serves as an authenticating image for the user to access an account or a service option associated with an account.

Regarding block 110, a user may input a selection of a service option on an image capture device that presents an electronic banking environment to the user. As used herein, an "option" may be one or more selectable icons, buttons, links, images, characters, text, and/or the like that are presented in an electronic banking environment, e.g., electronic graphical user interface (GUI). In some embodiments, the user may select the option using any acceptable form of input (mouseover input, touch screen input, a button input, a mouse click input, a keyboard input, a voice command input, or the like). An option may be associated with one or more a financial institution service such as a banking service. Exemplary financial institution services include, but are not limited to, funds transfers, mobile deposits (e.g., capturing an image of a check using an image capture device and then using the image to perform a deposit transaction), bill payments, modifications to account profiles (e.g., changing the account's password or passcode, address, etc.), and/or the like. As used herein, a passcode may be a string of characters, letters, numbers, symbols or the like that permit a user to access an account or a service associated with an account.

Regarding block 120, in some embodiments, the electronic banking environment refers to a graphical user interface (GUI). The electronic banking environment may permit online banking, mobile banking, text banking, or any other type of banking associated with the account. In some embodiments, the GUI enables a user to access information associated with the account. Additionally or alternatively, in some embodiments, the GUI enables the user to perform one or more transactions associated with the account (e.g., funds transfer, mobile deposit, bill payment, change mailing address, etc.). In some embodiments, the account is an electronic banking account (e.g., online banking account, mobile banking account, etc.), and the electronic banking account may be embodied as and/or accessible via the electronic banking environment.

Regarding block 120, an "authentication request" is a request that prompts a user of an image capture device to transmit information to the apparatus in order for the apparatus to make a determination regarding whether the user is allowed to access a financial institution service. In some embodiments, the authentication request prompts a user to initiate capture of an image of the front (and/or) back surface of a capturable authentication card associated with the account holder (or the account). Regarding block 120, the user may initiate capture of an image of a capturable authentication card using an image capture device. An embodiment of an image capture device is described below.

It will be understood that the apparatus having the process flow 100 (and/or any of the apparatus described and/or contemplated herein) may include one or more separate and/or different devices. For example, in some embodiments, a combination of devices (e.g., the transaction apparatus 1130, the image capture device 1120, etc.) is configured to perform the portions of the process flow 100 represented by blocks 110-120. However, in other embodiments, a single device is configured to perform each and every portion of the process flow 100. In addition, in some embodiments, a first portion of an apparatus is configured to perform one or more portions of the process flow 100, and one or more other portions of the same apparatus are configured to perform the one or more other portions of the process flow 100.

In some embodiments, the apparatus having process flow 100 is a transaction apparatus. The transaction apparatus is described in further detail with respect to FIG. 11. In some embodiments, the apparatus having the process flow 100 is an image capture device. The phrase "image capture device," as used herein, refers to an apparatus that is configured to generate, create, acquire, receive, view, and/or capture one or more still images and/or videos (collectively referred to herein as "images" for simplicity). In some embodiments, the image capture device refers to an apparatus that houses one or more digital cameras, image sensors, lens, and/or other image capture devices. For example, in some embodiments, the image capture device refers to a mobile computing device having a digital camera housed therein. However, in other embodiments, the image capture device refers to the image capture device itself. Referring to the example above, in accordance with some embodiments, the image capture device refers to the digital camera that is housed in the mobile phone. As a variation of this example, in still other embodiments, the image capture device refers to a digital camera that is not housed in the mobile phone, but is instead located adjacent, near, and/or otherwise proximate to the mobile phone (e.g., located within arm's reach of the mobile phone, etc.) and is operatively connected to (e.g., via wireline and/or wireless connection) the mobile phone. Thus, it will be understood that the image capture device can be embodied as an apparatus (e.g., a mobile phone that houses a digital camera, etc.), as a component of the apparatus (e.g., a digital camera housed in a mobile phone, etc.), or as a peripheral device associated with the apparatus (e.g., a digital camera operatively connected to and located proximately to a mobile phone, etc.). Additionally, in some embodiments, the phrase "image capture device" refers to a system having an image capture device and a peripheral image capture device operatively connected to the image capture device.

In addition, it will also be understood that the image capture device is so named because it is typically located remotely from a traditional deposit location, such as, for example, a financial institution, a banking center, teller terminal, an ATM, and/or the like. Instead, the image capture device is typically located in a home, an office, on a person, and/or remotely from a traditional deposit location. In addition, because an image capture device is configured to perform portions of the process flows 100 and/or 200, the image capture device enables its user(s) to transform any location where the image capture device is located into an ATM-like access point and therefore enables a user to perform one or more transactions that may traditionally be performed at a physical ATM.

Examples of image capture devices include, but are not limited to, mobile phones (e.g., feature phones, smart phones, camera phones, etc.), cameras (e.g., digital cameras, video cameras, webcams, etc.), scanners (e.g., flatbed scanners, handheld scanners, etc.), personal digital assistants (PDAs), tablet computers (e.g., iPads®, etc.), gaming devices (e.g., Nintendo® DSi, Xbox 360® with Kinect sensor device, etc.), portable media players (e.g., iPods®, etc.), e-readers, image capture devices (e.g., cameras, charge coupled devices (CCD), complementary metal-oxide-semiconductor (CMOS) sensors, other image sensors, etc.), as well as, in some embodiments, one or more components thereof and/or one or more peripheral devices associated therewith. In some embodiments, any computing device (e.g., a desktop/laptop computing device) that includes image capture functionality or is connected to any image capture device may be classified as an "image capture device." Of course, it will be understood that, in some embodiments, the image capture device is configured to perform one or more other functions (e.g., sending and/or receiving one or more phone calls, text messages, and/or other communications, etc.) in addition to generating and/or capturing one or more images. It will be further understood that, in some embodiments, the image capture device refers to a wireline, non-portable, non-mobile, and/or non-handheld device, such as, for example, a flatbed scanner and/or a webcam. However, in other embodiments, the image capture device refers to a wireless, portable, mobile, and/or handheld device, such as, for example, a handheld scanner and/or mobile phone. In some embodiments, the image capture device could also represent any remote computing device or electronic kiosk.

In some embodiments, the apparatus having the process flow 100 can be configured to perform any one or more portions of the process flow 100 represented by blocks 110-120 upon or after one or more triggering events, which, in some embodiments, is one or more of the other portions of the process flow 100. As used herein, it will be understood that a "triggering event" refers to an event that automatically triggers the execution, performance, and/or implementation of a triggered action, either immediately, nearly immediately (i.e., within seconds or minutes), or sometime after the occurrence of the triggering event. For example, in some embodiments, the apparatus is configured such that the apparatus receiving a request to access a financial institution service (the triggering event) automatically triggers the apparatus to initiate presentation of, in an electronic banking environment, a first authentication request and/or receive information associated with an account from an account datastore (the triggered action(s)). The apparatus may use the received information to compare with the information extracted from an image of the capturable authentication card in order to determine whether the capturable authentication card is valid.

In some embodiments, a predetermined time and/or the passage of a predetermined period of time may serve to trigger one or more of the portions represented by blocks 110-120. Also, in some embodiments, the apparatus is configured to automatically perform one or more (or all) of the portions of the process flow 100 represented by blocks 110-120. In other embodiments, one or more (or all) of the portions of the process flow 100 represented by blocks 110-120 require and/or involve at least some human intervention. In addition to the process flow 100, any of the embodiments described and/or contemplated herein can involve one or more triggering events, triggered actions, automatic actions, apparatus actions, and/or human actions.

It will also be understood that the apparatus having the process flow 100 may be configured to perform any one or more portions of any embodiment described and/or contemplated herein, including, for example, any one or more portions of the process flow 200 described later herein. In addition, the number, order, and/or content of the portions of the process flow 100 are exemplary and may vary. Indeed, the process flow 100, like all of the other process flows described herein, can include one or more additional and/or alternative process flow portions, and the apparatus configured to perform the process flow 100 can be configured to perform one or more additional and/or alternative functions.

Referring now to FIG. 2, a flowchart 200 is provided for authenticating access to a financial institution service, in accordance with some embodiments of the invention. In some embodiments, the process flow 200 is performed by an apparatus having hardware and/or software configured to perform one or more portions of the process flow 100. In some of these embodiments, the apparatus having the process flow 200 includes a transaction apparatus 201 and an image capture device 202. As used herein, a financial institution service may be any transaction (e.g., a financial transaction, a non-financial transaction, etc.) that is executed by a user with respect to an account maintained by a financial institution. In some embodiments, the authentication process may include a single level of authentication (e.g., validating an image of a capturable authentication card). In some embodiments, the authentication process may include multiple levels of authentication (e.g., validating an image of a capturable authentication card followed by validating a passcode associated with the capturable authentication card). This multi-level authentication process may be similar to an authentication process flow associated with a physical ATM where a user has to input a physical ATM card into the ATM followed by entering a passcode associated with the physical ATM card.

At block 204, a user accesses a mobile banking environment. In some embodiments, this means that the user executes a mobile banking application on a mobile device, such as mobile telephone configured with image capture capabilities or the like. For example, in some embodiments, the image capture device 202 is a mobile computing device, and the mobile banking application is an "app" that executes on the mobile computing device for initiating, executing, completing, and/or otherwise facilitating a banking transaction. In some embodiments, the mobile banking application requires the user to identify and/or authenticate himself/herself. For example, in some embodiments, the user provides a username/password, personal identification number (PIN), smart card, token (e.g., USB token, etc.), biometric information, and/or some other information, device, and/or credential to the image capture device 202 prior to the image capture device 202 granting the user access to the application. Further at block 204, the user selects an option to access a financial institution service (e.g., mobile deposit service) that is provided by the application. The user may select the financial institution service option using any acceptable form of input, e.g., mouse-over input, touch screen input, a button input, a mouse click input, a keyboard input, a voice command input, or the like. In other embodiments, an authentication process described herein may be used as an authentication process for accessing the mobile banking application. In such embodiments, a user is prompted to capture an image of a capturable authentication card, or an image of some other physical object associated with the user, when a user selects the mobile banking application on the image capture device.

Thereafter, as represented by block 208, the transaction apparatus 201 receives a request (e.g., user selected a selectable option associated with the mobile banking application) to access a service (e.g., financial institution service) offered by the mobile banking application. Thereafter, as represented by block 212, the image capture device 202 is configured to prompt the user to position the capturable authentication card (e.g., frontal surface of the capturable authentication card) relative to the image capture device such that the capturable authentication card is exposed to the image capture device 202. In some embodiments, this means that the user is prompted to position the capturable authentication card on a flat surface, and/or position the capturable authentication card such that the image capture device 202 is positioned orthogonally with respect to the capturable authentication card, and/or position the capturable authentication card such that all four corners of the capturable authentication card are captured, and/or position the capturable authentication card such that the front surface of the capturable authentication card is illuminated by adequate lighting, etc. In some embodiments, the user is prompted to position the image capture device 202 proximate and/or relative to the capturable authentication card, such that light reflected from the capturable authentication card is physically received by the image capture device 202. For example, in some embodiments, the image capture device 202 includes a photographic lens and an image sensor, and the image sensor is configured to generate an image of the capturable authentication card based at least partially on light reflected from the capturable authentication card passing through the lens, reaching the image sensor, and being converted into electrical signals by the image sensor. It will be understood that the image capture device 202 can be configured to generate one or more still images of the capturable authentication card and/or a series of video images of the capturable authentication card.

Thereafter, as represented by block 216, once the frontal surface of the capturable authentication card is positioned by the user, in some embodiments, the image capture device 202, as represented by block 216, may be configured to allow the user to execute an act (such as clicking on, pressing, or otherwise selecting a digital button, a physical button, or the like) such that the image capture device 202 captures an image of the capturable authentication card. In other embodiments, the image capture device 202 may automatically capture an image of the capturable authentication card once the image capture device 202 determines that the capturable authentication card is appropriately exposed to the image capture device 202. In some embodiments, the image capture device "capturing" the image generally means that the image capture device 202 stores the image of the capturable authentication card in the memory of the image capture device 202. In some embodiments, this memory is non-temporary, non-volatile, and/or long-term persistent memory. Additionally or alternatively, in some embodiments, the image is captured if a user of the image capture device 202 can retrieve the image from the memory of the image capture device 202 sometime after the capturable authentication card is exposed to the image capture device 202. Of course, it will be understood that the image capture device 202 may not capture every image that it generates. For example, in some embodiments, the image capture device 202 discards and/or erases generated images that are not captured. However, in other embodiments, the image capture device 202 does not discard or erase generated images that are not captured, but instead identifies and/or stores them differently. For example, in some embodiments, the image capture device 202 stores generated but not captured images in temporary and/or volatile memory, whereas the image capture device 202 stores captured images in non-temporary, non-volatile, and/or long-term persistent memory. In some embodiments, the image capture device 202 may also prompt a user to initiate capture of an image of the back surface of the capturable authentication card. Thus, in some embodiments, the image capture device 202 may repeat blocks 212 and 216 for the back surface of the capturable authentication card.

In some embodiments, after the image capture device captures an image of the capturable authentication card, the image capture device may automatically indicate to the user regarding whether the image is clear enough (e.g., passes a minimum clarity threshold) for the transaction apparatus 201 (and/or the image capture device 202) to extract data required for the authentication process. In other embodiments, the user of the image capture device may have to determine by himself/herself whether the image is clear enough for the transaction apparatus 201 (and/or the image capture device 202) to extract data required for the authentication process. Thereafter, as represented by block 216, the image capture device may transmit the captured image(s) of the capturable authentication card to the transaction apparatus 201 after receiving a transmit instruction from the user (e.g., the user selects a transmit option on the image capture device 202). In alternate embodiments, the image capture device 202 may be configured to automatically transmit the image (e.g., via a wireless network, via the Internet, etc.) when the image capture device 202 automatically determines that the image of the capturable authentication card is clear enough for the transaction apparatus 201 (and/or the image capture device 202) to extract data required for the authentication process.

Thereafter, at block 220, the transaction apparatus 201 is configured to receive an image of the capturable authentication card. In some embodiments, the transaction apparatus 201 is configured to receive images of both the front and back surface of the capturable authentication card. Subsequently, the transaction apparatus 201 may be configured to extract data from the image of the capturable authentication card. In some embodiments, the transaction apparatus 201 may be configured to extract one or more account identifiers from the image of the capturable authentication card. For instance, the transaction apparatus 201 may be configured to extract data that is visible (e.g., visible to the human eye) on the image of the capturable authentication card. This data may include the capturable authentication card number, the expiration date of the capturable authentication card, the type of capturable authentication card (e.g., bronze, silver, gold, platinum, etc.), a picture of the account holder, a security code associated with the capturable authentication card, a signature associated with the account holder, etc. In some embodiments, the transaction apparatus 201 may also be configured to extract an "authentication code" that is visible on the image. In some embodiments, every capturable authentication card issued by a financial institution may have a unique authentication code. In some embodiments, the authentication code is a barcode or some other visually-perceptible code. An embodiment of a barcode is visible in FIG. 6. In some embodiments, the authentication code may extend along either (or both) the entire length or entire width of the capturable authentication card. In some embodiments, there may be more than one authentication code on the surface of the capturable authentication card. In such embodiments, each authentication code may be associated with authenticating a user to access a separate service option. Therefore, a particular authentication code may only authenticate a user to access a particular service option (or a particular set of service options) associated with that particular authentication code. In other embodiments, the authentication code may be a string including alphanumeric characters, symbols, graphics, or any combination thereof. In embodiments where there are multiple authentication codes associated with a capturable authentication card, a first authentication code may be a barcode, a second authentication code may be a string of characters, a third authentication code may be an invisible code (described below), etc. In some embodiments, the authentication code may be alternatively present on the back surface of the capturable authentication card instead of being present on the front surface of the capturable authentication card. In other embodiments, the authentication code may be present on the back surface of the capturable authentication card in addition to being present on the front surface of the card.

In some embodiments, the transaction apparatus 201 may be configured to extract information (e.g., an authentication code) that is not visible (e.g., not visible to the human eye) on the image of the capturable authentication card. In some embodiments, the authentication code is not visible on the image of the capturable authentication card, but is instead derived from the transaction apparatus 201 performing one or more operations using the one or more other information extracted from the image of the capturable authentication card. For instance, the transaction apparatus 201 may compute an authentication code based on the digits of the capturable authentication card number. As another instance, the transaction apparatus 201 may compute an authentication code by converting each digit in the name of the account holder to a number, and then computing an authentication code using these numbers. Alternatively, the transaction apparatus may use multiple pieces of extracted information (e.g., the name of the account holder, the capturable authentication card number, etc.) to compute the authentication code. In some embodiments, the transaction apparatus may also be configured to extract a signature that is visible on the image of the capturable authentication card (e.g., on the back surface of the capturable authentication card).

Regarding block 220, the transaction apparatus 201 may be additionally triggered to receive information or data associated with an account (e.g., from an account datastore/database/repository) in response to the transaction apparatus receiving an image of a capturable authentication card associated with the account holder (or the account). In alternate embodiments, the transaction apparatus may be triggered to receive information or data associated with an account (e.g., from an account datastore/database/repository) in response to the transaction apparatus receiving a request to access a financial institution service. In alternate embodiments, the transaction apparatus may be triggered to receive information or data associated with an account (e.g., from an account datastore/database/repository) in response to the transaction apparatus receiving a request to access an electronic banking environment (e.g., mobile banking application). In still other embodiments, the transaction apparatus may be triggered to receive information associated with an account (e.g., from an account datastore/database/repository) in response to one or more of the above events. In some embodiments there may be a small delay (e.g., a few (zero to thirty) seconds or a few (e.g., up to two) minutes) between the triggering event and the receiving of the information. The transaction apparatus may use the received information to compare with the information extracted from an image of the capturable authentication card in order to determine whether the capturable authentication card is valid. In other alternate embodiments, the apparatus may not receive any information, at all, at block 220. In such embodiments, the apparatus may not receive any information because the apparatus may be able to authenticate a user without the need for any information apart from the information extracted from an image of a capturable authentication card associated with the account holder (or the account).

Regarding block 220, the received information at the transaction apparatus may include financial institution data associated with the account or the account holder. Information associated with an account may include an account number, a capturable authentication card number, a capturable authentication card expiration date, one or more names associated with the account, one or more security codes associated with the capturable authentication card, a capturable authentication card type, rules and regulations (e.g., credit limits, withdrawal limits, usage limits, transaction limits, etc.) associated with the capturable authentication card and/or an account, one or more authentication codes associated with the capturable authentication card (e.g., barcode) or account (e.g., passcode), previously captured images associated with the capturable authentication card (e.g., front and back images of the entire card, or an image of an authentication code on the capturable authentication card (e.g., barcode) or the account holder (e.g., frontal and/or side views of account holder's face). Other financial institution data associated with the account may include transactional level data (e.g., the transaction history associated with an account), such as checking transactions, ATM transactions, and credit/debit card transactions, etc. As used herein, a "transaction" may be monetary in nature (e.g., a purchase via a credit card; depositing a deposit item, e.g., a check, in an account; requesting a credit or cash advance; a stock trade or the like) or non-monetary in nature (e.g., a telephone call; an encounter with a financial institution or non-financial institution associate/representative; an identity authentication process, such as a biometric identity authentication process; recorded use of a utility, such as electricity and the like). Additionally, the financial institution data may include account data, such as account balances and the like of the account, account balances and the like of other accounts held by account holder at the financial institution, ages of account holder's accounts, any remarks associated with account holder's accounts, interest accrued by account, and account holder data, such as personal data, profile data, demographics data, contact information, and the like. The types of financial institution data are not limited to the types of data discussed herein. The financial institution data may be captured in one or more databases that allow for analytics and/or logic to be performed on the data. As used herein, the term "information" includes "data."

Subsequently, at block 224, the transaction apparatus 201 may be configured to determine whether the capturable authentication card is valid. As used herein, determining whether a card is "valid" is a first step in authenticating a user to access a service option. For example, a capturable authentication card is "valid" if it is issued by a financial institution to an account holder, has not expired, can be used to authenticate the user to financial institution services at a physical ATM, etc.

In some embodiments, the transaction apparatus may be configured to first determine whether the capturable authentication card is a card that is eligible to access the financial institution service selected by the user. In some embodiments, the transaction apparatus makes this determination by determining the type of capturable authentication card (e.g., "Platinum ATM card" of FIG. 6). In other embodiments, the transaction apparatus makes this determination by determining the type of capturable authentication card from a symbol, graphic, etc. that is visible on the capturable authentication card (see 650 of FIG. 6). In still other embodiments, the transaction apparatus makes this determination using other extracted information from the image of the capturable authentication card (e.g., the account number, the expiration date, the security code, etc.). In still other embodiments, the transaction apparatus makes this determination using information associated with the authentication code extracted from the image of the capturable authentication card.

Further regarding block 224 or other any process block of FIGS. 1 and 2, it will be understood that, in some embodiments, the term "determine" is meant to have its one or more ordinary meanings (i.e., its ordinary dictionary definition(s)), but in other embodiments, that term is additionally or alternatively meant to include the one or more ordinary meanings of one or more of the following terms: conclude, decide, identify, ascertain, find, discover, learn, verify, calculate, observe, read, extract, and/or the like. Further, it will be understood that, in some embodiments, the phrase "based at least partially on" is meant to have its one or more ordinary meanings, but in other embodiments, that phrase is additionally or alternatively meant to include the one or more ordinary meanings of one or more of the following phrases: "in response to," "upon or after," "because of," "as a result of," "if," "when," and/or the like.

In some embodiments, the transaction apparatus 201 may be configured to determine whether the capturable authentication card is valid by determining an authentication code from the image of the capturable authentication card and determining whether the authentication code matches one of a plurality of authentication codes stored in a code repository. In such embodiments, the transaction apparatus may be able to access a plurality of authentication codes that are stored in a code repository. The transaction apparatus may then apply a comparison algorithm to compare the authentication code associated with the image of the capturable authentication card to the authentication codes stored in the code repository. If there is a match (to a predetermined degree of confidence) between the authentication code associated with the image of the capturable authentication card and an authentication code stored in the code repository, then the transaction apparatus may consider this match as the sole determining factor or as one of multiple factors in determining whether the capturable authentication card is valid.

In some embodiments, the transaction apparatus 201 may be configured to determine whether the capturable authentication card is valid by determining an authentication code from the image of the capturable authentication card and determining the authentication code is associated with the one or more account identifiers associated with the account. For example, the transaction apparatus may access a database where the database includes information that a particular authentication code is associated with a particular capturable authentication card, the particular capturable authentication card being associated with a particular account, a name of an account holder, a capturable authentication card number, an expiration date, a picture of an account holder, a security code, a signature, etc. Therefore, the transaction apparatus may determine whether there is a match between the extracted authentication code (from the received image of the capturable authentication card) and the authentication code for a particular account (e.g., Account 'ABC') pulled from a database. Additionally, the transaction apparatus may determine whether there is a match between extracted account identifiers (from the received image of the capturable authentication card) and the account identifiers associated with the same account (i.e., Account ABC) that was pulled earlier from the database. If there is a match on both these counts, then the transaction apparatus may use this information as the sole determining factor or as one of multiple factors in determining whether the capturable authentication card is valid.

In other embodiments, the transaction apparatus may not access any database. Instead, the transaction apparatus may perform an operation on the authentication code to arrive at a first result, perform an operation on the one or more account identifiers to arrive at a second result, and then determine whether the first result is consistent with the second result. For example, the transaction apparatus may convert the various parts of the authentication code to one or more numbers and then generate the first result by performing a mathematical operation using these one or more numbers. Additionally, the transaction apparatus may convert the one or more account identifiers to numbers and then generate the second result by performing a mathematical operation using these one or more numbers. Additionally, the transaction apparatus may compare the first result to the second result to determine whether the comparison yields an expected final result. The transaction apparatus may use the result of the comparison as the sole determining factor or as one of multiple factors in determining whether the capturable authentication card is valid.

In some embodiments, the transaction apparatus 201 may be configured to determine whether the capturable authentication card is valid by determining an authentication code from the image of the capturable authentication card and processing the authentication code to determine the authentication code is a valid authentication code. In some embodiments, the transaction apparatus performs an operation on the authentication code itself (e.g., the transaction apparatus converts each character of the authentication code to a number, performs one or more mathematical operations using these numbers to generate a result, and then determines whether the result is an expected result). The transaction apparatus may use the result of the operation as a factor in determining whether the capturable authentication card is valid. In such embodiments, the transaction apparatus may not compare the authentication code to other information (e.g., other account identifiers determined from the capturable authentication card) and may not compare the authentication code to information pulled from one or more databases. Since this embodiment of the method does not require pulling information associated with one or more databases, this embodiment of the method may be performed solely by the image capture device 202, without any involvement of the transaction apparatus.

In some embodiments, the transaction apparatus 201 may be configured to determine whether the capturable authentication card is valid by identifying an image of the account holder from the image of the capturable authentication card, and determining the image of the account holder substantially matches an image of the account holder stored in an image repository. In such embodiments, the transaction apparatus may be able to access a plurality of images that are stored in an image repository. The transaction apparatus may then apply a comparison algorithm to compare the image of the account holder extracted from the image of the capturable authentication card to the images stored in the image repository. In some embodiments, if there is a match (to a predetermined degree of confidence) between the image of the account holder extracted from the image of the capturable authentication card and an image in the image repository, then the transaction apparatus may consider this as the sole determining factor or as one of multiple factors in determining whether the capturable authentication card is valid.

In some embodiments, the transaction apparatus 201 may be configured to determine whether the capturable authentication card is valid by identifying an image of the account holder from the image of the capturable authentication card, and determining the image of the account holder is associated with the one or more account identifiers associated with the account. For example, the transaction apparatus may access a database where the database includes information that a particular image of an account holder is associated with a particular capturable authentication card, the particular capturable authentication card being associated with a particular account, a name of an account holder, a capturable authentication card number, an expiration date, a picture of an account holder, a security code, a signature, etc. Therefore, the transaction apparatus may determine whether there is a match (to a predetermined degree of confidence) between the extracted image of the account holder (from the received image of the capturable authentication card) and the image of the account holder associated with an account (e.g., Account 'ABC') pulled from a database. Additionally, the transaction apparatus may determine whether there is a match between extracted account identifiers (from the received image of the capturable authentication card) and the account identifiers associated with the same account (i.e., Account ABC) that was pulled earlier from the database. If there is a match on both these counts, then the transaction apparatus may use this information as a factor in determining that the capturable authentication card is valid. In other embodiments, the transaction apparatus may not access any database. Instead, the transaction apparatus may perform an operation on the extracted image of the account holder to arrive at a first result, perform an operation on the one or more account identifiers to arrive at a second result, and then determine whether the first result is consistent with the second result. For example, the transaction apparatus may convert the various parts of the image of the account holder to one or more numbers and then generate the first result by performing a mathematical operation using these one or more numbers. For example, a first part of the image may be the dimensions associated with a first portion of the account holder's face, a second part of the image of the image may be the dimensions associated with a second portion of the account holder's face, etc. Additionally, the transaction apparatus may convert the one or more account identifiers to numbers and then generate the second result by performing a mathematical operation using these one or more numbers. Additionally, the transaction apparatus may compare the first result to the second result to determine whether the comparison yields an expected final result. The transaction apparatus may use the result of the comparison as the sole determining factor or as one of multiple factors in determining whether the capturable authentication card is valid.

In some embodiments, the transaction apparatus 201 may be configured to determine whether the capturable authentication card is valid by determining the image of the account holder is associated with the authentication code. For example, the transaction apparatus may access a database where the database includes information that a particular image of an account holder is associated with a particular authentication code, where both the particular image of the account holder and the particular authentication code are associated with a particular account. Therefore, the transaction apparatus may determine whether there is a match (to a predetermined degree of confidence) between the extracted image of the account holder (from the received image of the capturable authentication card) and the image of the account holder associated with an account (e.g., Account 'ABC') pulled from a database. Additionally, the transaction apparatus may determine whether there is a match between extracted authentication code (from the received image of the capturable authentication card) and the authentication code associated with the same account (i.e., Account ABC) that was pulled earlier from the database. If there is a match on both these counts, then the transaction apparatus may use this information as a factor in determining that the capturable authentication card is valid. In other embodiments, the transaction apparatus may not access any database. Instead, the transaction apparatus may perform an operation on the extracted image of the account holder to arrive at a first result, perform an operation on the extracted authentication code to arrive at a second result, and then determine whether the first result is consistent with the second result. For example, the transaction apparatus may convert the various parts of the image of the account holder to one or more numbers and then generate the first result by performing a mathematical operation using these one or more numbers. Additionally, the transaction apparatus may convert the characters of the authentication code to one or more numbers and then generate the second result by performing one or more mathematical operation using these one or more numbers. Additionally, the transaction apparatus may compare the first result (using a comparison algorithm) to the second result to determine whether the comparison yields an expected final result. The transaction apparatus may use the result of the comparison as the sole determining factor or as one of multiple factors in determining whether the capturable authentication card is valid.

In some embodiments, the transaction apparatus 201 may be configured to determine whether the capturable authentication card is valid by identifying an image of the account holder from the image of the capturable authentication card, initiating presentation of a request prompting a user to initiate capture of an image of the user, and determining the image of the account holder substantially matches the captured image of the user. For example, the image capture device 202 may prompt the user of the image capture device to capture an image of the user either before or after transmitting an image of the capturable authentication card. Once the transaction apparatus receives both the image of the capturable authentication card and the image of the user, the transaction apparatus may extract the image of the account holder from the image of the capturable authentication card and then apply a comparison algorithm to compare the extracted image of the account holder to the received image of the user. If there is a match (to a predetermined degree of confidence) between both images, the transaction apparatus may consider this match as the sole determining factor or as one of multiple factors in determining whether the capturable authentication card is valid.

In some embodiments, before or after transmitting the image of the capturable authentication card to the transaction apparatus 201, the image capture device 202 may prompt the user to transmit one or more other pieces of identifying information associated with the user. For instance, the image capture device may prompt the user to transmit one or more pieces of identifying information, e.g., a voice sample, a fingerprint sample, a handwriting sample (e.g., a signature), etc., associated with the user. In such embodiments the image capture device may include one or more input devices that can capture voice samples, fingerprint samples, handwriting samples (e.g., touchscreen input), etc. In such embodiments, the transaction apparatus may be able to access a database that includes an account holder's identifying information, e.g., voice samples, fingerprint samples, handwriting samples, etc. The transaction apparatus may then apply a comparison algorithm to compare the identifying information received from the image capture device to the identifying information pulled from the database. In some embodiments, if there is a match (to a predetermined degree of confidence) between the identifying information received from the image capture device and the identifying information pulled from the database, then the transaction apparatus may consider this as the sole determining factor or as one of multiple factors in determining whether the capturable authentication card is valid.

In some embodiments, an image capture device user may input a signature using a stylus via a touchscreen input associated with the image capture device. In such embodiments where the image capture device transmits a live signature associated with the image capture device user, the transaction apparatus 201 may compare the transmitted signature with a signature extracted from the image of the capturable authentication card, instead of or in addition to, comparing the transmitted signature with a signature of the account holder that is pulled from a database. In some embodiments, the transaction apparatus may also compare the signature of the account holder extracted from the capturable authentication card with the signature of the account holder pulled from a database. In some embodiments, a signature associated with the account holder may be part of the front surface of the capturable authentication card. In other embodiments, a signature associated with the account holder may be part of the back surface of the capturable authentication card, and in such embodiments, the image capture device may automatically determine that a signature is not present on the front surface of the capturable authentication card, and may consequently prompt the image capture device user to initiate capture of an image of the back surface of the capturable authentication card. In some embodiments, if there is a match (to a predetermined degree of confidence) between the live signature received from the image capture device 202 and the signature extracted from the capturable authentication card and/or the signature pulled from a database, then the transaction apparatus may consider this as a factor in determining that the capturable authentication card is valid. In some embodiments, if there is a match (to a predetermined degree of confidence) between the signature extracted from the capturable authentication card and the signature of the account holder pulled from a database, then the transaction apparatus may consider this as the sole determining factor or as one of multiple factors in determining whether the capturable authentication card is valid.

In some embodiments, the transaction apparatus 201 may be configured to determine whether the capturable authentication card is valid by accessing previous instances of an image of the capturable authentication card transmitted to the transaction apparatus, and comparing previous instances of the transmitted image of the capturable authentication card to the current instance of the image of the capturable authentication card that is transmitted to the transaction apparatus. In such embodiments, the transaction apparatus 201 may be able to access previously received images of the capturable authentication card from an image repository. The transaction apparatus may then apply a comparison algorithm to compare the currently received image of the capturable authentication card to previously received images of the capturable authentication card stored in an image repository. In some embodiments, if there is a match (to a predetermined degree of confidence) between the currently received image of the capturable authentication card and an image of the capturable authentication card stored in an image repository, then the transaction apparatus may consider this as the sole determining factor or as one of multiple factors in determining whether the capturable authentication card is valid.

In some embodiments, the transaction apparatus 201 may be configured to determine whether the capturable authentication card is valid by determining the source (e.g., location of the image capture device 202, identification information associated with the image capture device or the like) of the image transmitted to the transaction apparatus. In some embodiments, the image capture device may transmit identification information (e.g., a serial number) associated with the image capture device in addition to an image of a capturable authentication card. In some embodiments, the transaction apparatus may identify that the image of the capturable authentication card is transmitted from a particular image capture device which previously transmitted an image of the capturable authentication card that was determined as a valid card or may identify that the image of the capturable authentication card is transmitted from an image capture device that has previously been used to access an electronic banking account associated with the account holder. In such embodiments, the transaction apparatus may automatically determine that the image capture device is a trusted source and may use this as a factor in determining the capturable authentication card is valid. In other embodiments, the transaction apparatus may determine that the image capture device is a trusted source based on an account holder's previous selection of the particular image capture device as a trusted source for transmitting an image of a capturable authentication card.

In still other embodiments, the image capture device may transmit, in addition to an image of a capturable authentication card, location information (e.g., network address, global positioning system (GPS) coordinates, etc.), associated with the image capture device that transmits an image of a capturable authentication card to the transaction apparatus. In some embodiments, the transaction apparatus may identify that the image of the capturable authentication card is transmitted from a particular trusted location (e.g., a valid image of the capturable authentication card was previously transmitted from this particular location) or may identify that the image of the capturable authentication card is transmitted from a location from where an image capture device was previously used to access an electronic banking account associated with the account holder. In such embodiments, the transaction apparatus may automatically determine that the particular location is a trusted location and may use this as a factor in determining the capturable authentication card is valid. In other embodiments, the transaction apparatus may determine that the particular location is a trusted location based on an account holder's previous selection of the location as a trusted location for transmitting an image of a capturable authentication card. In embodiments where the location of the image capture device is defined by an address such as GPS coordinates, the transaction apparatus may compare the address associated with the current transmittal of an image of a capturable authentication card with the address of a trusted location to determine how proximal the current address to the trusted location. If the current address is within a predetermined degree of proximity to the trusted location, then the transaction apparatus may determine that the current address constitutes a trusted location.

In some embodiments, the transaction apparatus 201 may be configured to determine whether the capturable authentication card is valid by using a combination of one or more of the above described factors. For instance, in order to determine the capturable authentication card is valid, the transaction apparatus may be configured to determine that the authentication code extracted from the image of the capturable authentication card matches an authentication code stored in a code repository, and/or the image of the account holder extracted from the image of the capturable authentication card substantially matches (to a predetermined degree of confidence) an image stored in the image repository, and/or the authentication code extracted from the image of the capturable authentication card is associated with one or more account identifiers (also extracted from the image of the capturable authentication card), and/or other user-identifying information (e.g., a signature) received from the image capture device 202 matches (to a predetermined degree of confidence) a signature of the account holder stored in an account database/repository, etc.

If the apparatus determines that the capturable authentication card is not valid at block 224, the transaction apparatus 201 may transmit this information to the image capture device 202. The image capture device may then present a message to the user, where the message describes that the user's attempt to access the selected service option is rejected. In some embodiments, the image capture device may present the user with an option to recapture an image of the capturable authentication card and retransmit the image of the capturable authentication card to the transaction apparatus. If the transaction apparatus determines that the capturable authentication card is valid at block 224, the transaction apparatus may transmit this information to the image capture device. The image capture device may then allow a user to access the service option (e.g., the mobile deposit service) by leading the user to the mobile deposit service option homepage. In other embodiments, once the transaction apparatus determines that the capturable authentication card is valid at block 224, the transaction apparatus may transmit another request to the image capture device (in addition to the request that was transmitted previously at block 212). This request may prompt the user to enter a passcode (e.g., a personal identification number (PIN)). In some embodiments, this passcode may be a passcode associated with the account. In other embodiments, this passcode may be associated with the capturable authentication card (e.g., this passcode may be the same passcode with which the user authenticates himself/ herself at a physical ATM). In still other embodiments, this passcode may be a unique passcode that is associated with the service option that the user has selected.

Thereafter, the user inputs the passcode via an input device associated with the image capture device 202. Subsequently, the passcode is transmitted from the image capture device to the transaction apparatus 201. Thereafter, at block 236, the transaction apparatus determines whether the passcode is correct. In some embodiments, the transaction apparatus may determine whether the passcode is correct by comparing the received passcode with a stored passcode pulled from a database. In other embodiments, the transaction apparatus may determine whether the passcode is correct by performing an operation on the received passcode (e.g., converting the characters of the passcode to numbers, executing a mathematical operation on the numbers, and determining whether the result of the mathematical operation produces an expected result). In such embodiments, the transaction apparatus does not compare the received passcode with a stored passcode. If the apparatus determines that the received passcode is correct, the transaction apparatus may transmit this information to the image capture device. The image capture device may then present a message to the user, where the message describes that the user's attempt to access the selected service option is rejected because of an incorrect passcode. In some embodiments, the image capture device may allow a user to re-input the passcode. If the transaction apparatus determines that the received passcode is correct, the transaction apparatus transmits this information to the image capture device. Subsequently, at block 240, the image capture device may allow a user to access the service option (e.g., the mobile deposit service) by proceeding to the mobile deposit service option homepage.

In some embodiments, the apparatus having the process flow 200 can be configured to perform any one or more portions of the process flow 200 represented by blocks 204-240 upon or after one or more triggering events, which, in some embodiments, is one or more of the other portions of the process flow 200. As used herein, it will be understood that a "triggering event" refers to an event that automatically triggers the execution, performance, and/or implementation of a triggered action, either immediately, nearly immediately (i.e., within minutes), or sometime after the occurrence of the triggering event. For example, in some embodiments, the apparatus (e.g., the transaction apparatus 201) is configured such that the apparatus (e.g., the transaction apparatus 201) receiving a request to access a service option (the triggering event) automatically triggers the apparatus (e.g., the transaction apparatus 201) to receive information associated with an account from an account datastore and/or triggers the apparatus (e.g., the image capture device 202) to present, in an electronic banking environment, a first authentication request (the triggered action(s)). In other embodiments, the apparatus (e.g., the transaction apparatus 201) is configured such that the apparatus (e.g., the transaction apparatus 201) receiving an image of the capturable authentication card (the triggering event) automatically triggers the apparatus (e.g., the transaction apparatus 201) to receive information associated with an account from an account datastore and/or triggers the apparatus (e.g., the image capture device 202) to present, in an electronic banking environment, a second authentication request (the triggered action(s)). The apparatus may use the received information to compare with the information extracted from an image of the capturable authentication card in order to determine whether the capturable authentication card is valid.

In some embodiments, a predetermined time and/or the passage of a predetermined period of time may serve to trigger one or more of the portions represented by blocks 204-240. Also, in some embodiments, the apparatus (e.g., the transaction apparatus 201 and the image capture device 202) are configured to automatically perform one or more (or all) of the portions of the process flow 200 represented by blocks 204-240. In other embodiments, one or more (or all) of the portions of the process flow 200 represented by blocks 204-240 require and/or involve at least some human intervention. In addition to the process flow 200, any of the embodiments described and/or contemplated herein can involve one or more triggering events, triggered actions, automatic actions, apparatus actions, and/or human actions. In addition, the number, order, and/or content of the portions of the process flow 200 are exemplary and may vary. Indeed, the process flow 200, like all of the other process flows described herein, can include one or more additional and/or alternative process flow portions, and the apparatus configured to perform the process flow 200 can be configured to perform one or more additional and/or alternative functions.

FIGS. 3-10 illustrate example screenshots of the electronic banking environment associated with a banking account. For the screenshots presented in FIGS. 3-10, the electronic banking environment is a graphical user interface that presents information associated with a mobile banking account. In other embodiments, the banking environment may be a graphical user interface that presents information associated with an online banking account, text banking account, etc. The screenshots discussed below with respect to various process blocks are mere examples of screenshots in some embodiments of the invention. In other embodiments of the invention, the screenshots may include additional features not described herein, or may not include each and every feature described herein. As used with respect to the various screenshots of FIGS. 3-10, an "apparatus" may either be a transaction apparatus 1130 or an image capture device 1120. The apparatus may generate the screenshots presented in FIGS. 3-10 and may cause the presentation of one or more elements in each screenshot presented in FIGS. 3-10.

Figure 3:
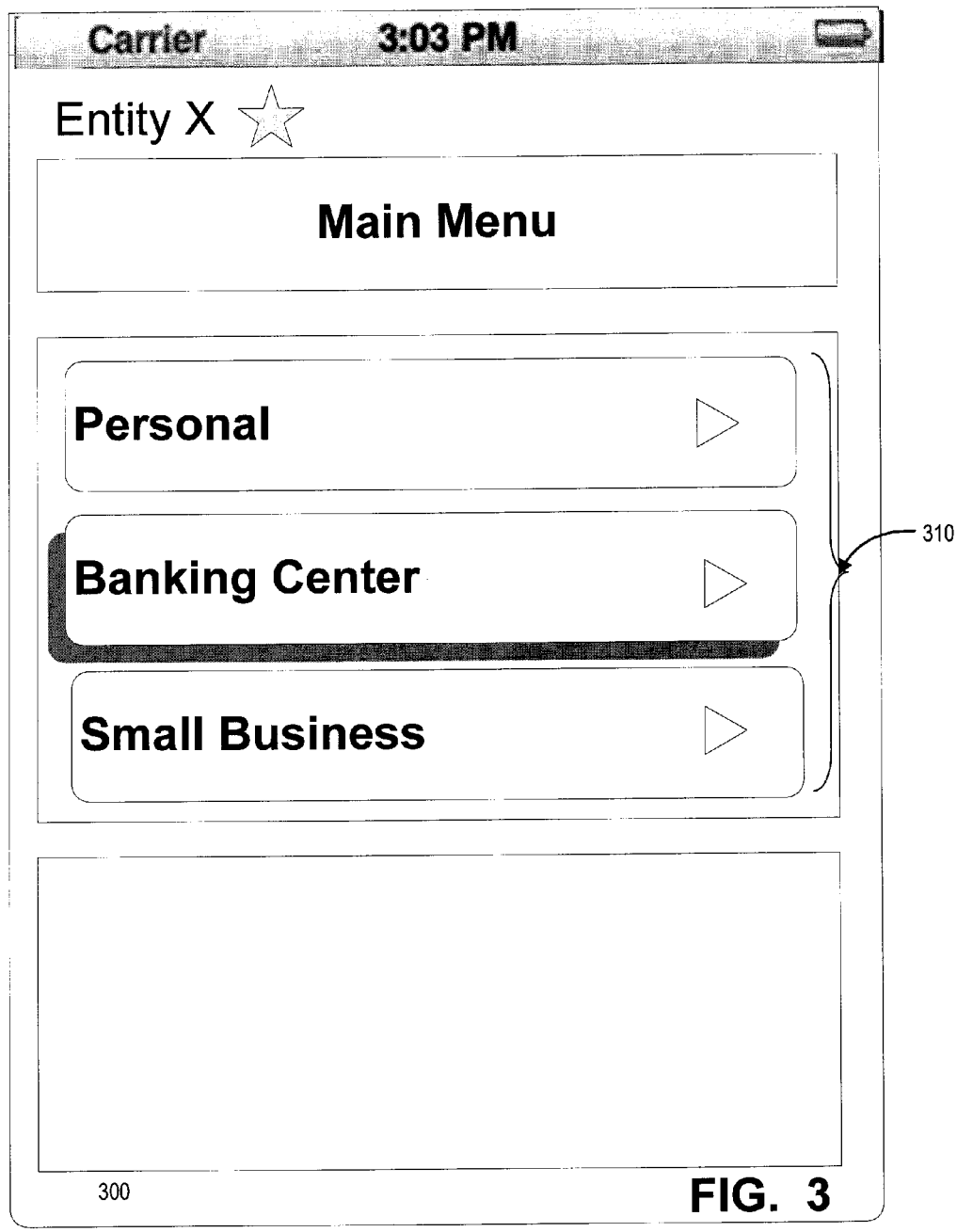

FIG. 3 presents a screenshot of a homepage 300 of a mobile financial institution service or application. In some embodiments, the apparatus presents this screenshot after a user has been authenticated (e.g., input username and password) for the purpose of using the mobile banking service/application. In other embodiments, the apparatus presents this screenshot before a user has been authenticated into an account. The screenshot in FIG. 3 presents various account options or channels 310 that a user may access. For instance, the various account options are 'Personal,' 'Banking Center,' and 'Small Business.'

Figure 4:
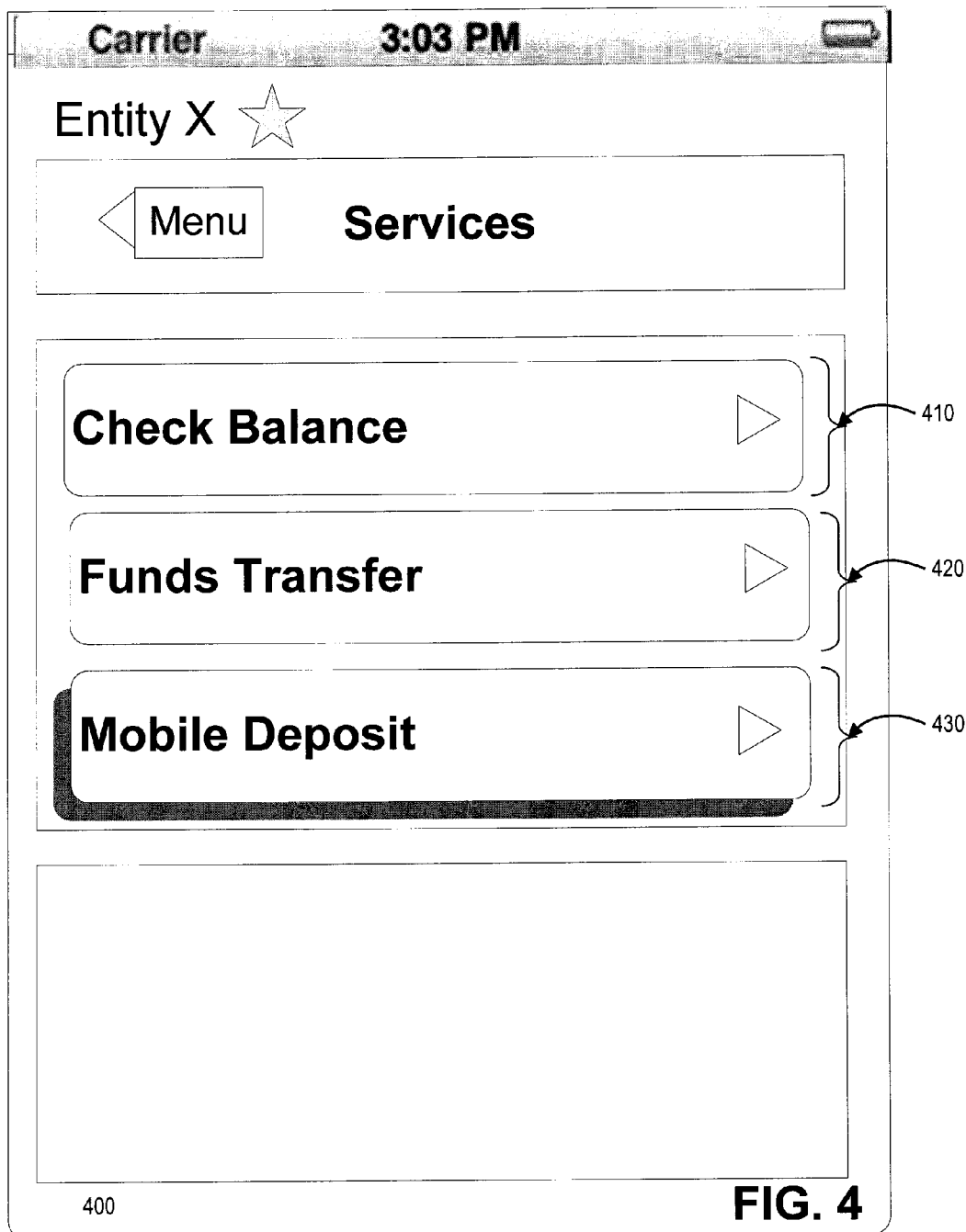

Referring now to FIG. 4, when the user selects the 'Banking Center' option of FIG. 3, the apparatus directs a user to a page 400 that includes three service options: 'Check Balance,' 410 'Funds Transfer,' 420 and 'Mobile Deposit' 430. In some embodiments, upon a user's selection of the 'Banking Center' option, an apparatus determines that the account is eligible to participate in the 'Check Balance,' 'Funds Transfer,' and 'Mobile Deposit' services. In some embodiments, this determination is made in substantially real-time. This may mean that the determination was made instantly upon a user's selection of the 'Banking Center' option. In other embodiments, this may mean that the determination was made a short duration after the user's selection of the 'Banking Center' option. In some embodiments, this duration may be few seconds (e.g., thirty seconds) or few minutes (e.g., two or three minutes). Therefore, in some embodiments, there may be a slight delay from the moment a user selects the 'Banking Center' option to the moment the service options appear on the mobile application interface (FIG. 4). In some embodiments, if the apparatus determines that the account is not eligible to participate in the 'Mobile Deposit' service, the 'Mobile Deposit' service option may not be displayed in the electronic banking environment (e.g., on the graphical user interface/mobile application interface).

Figure 5:
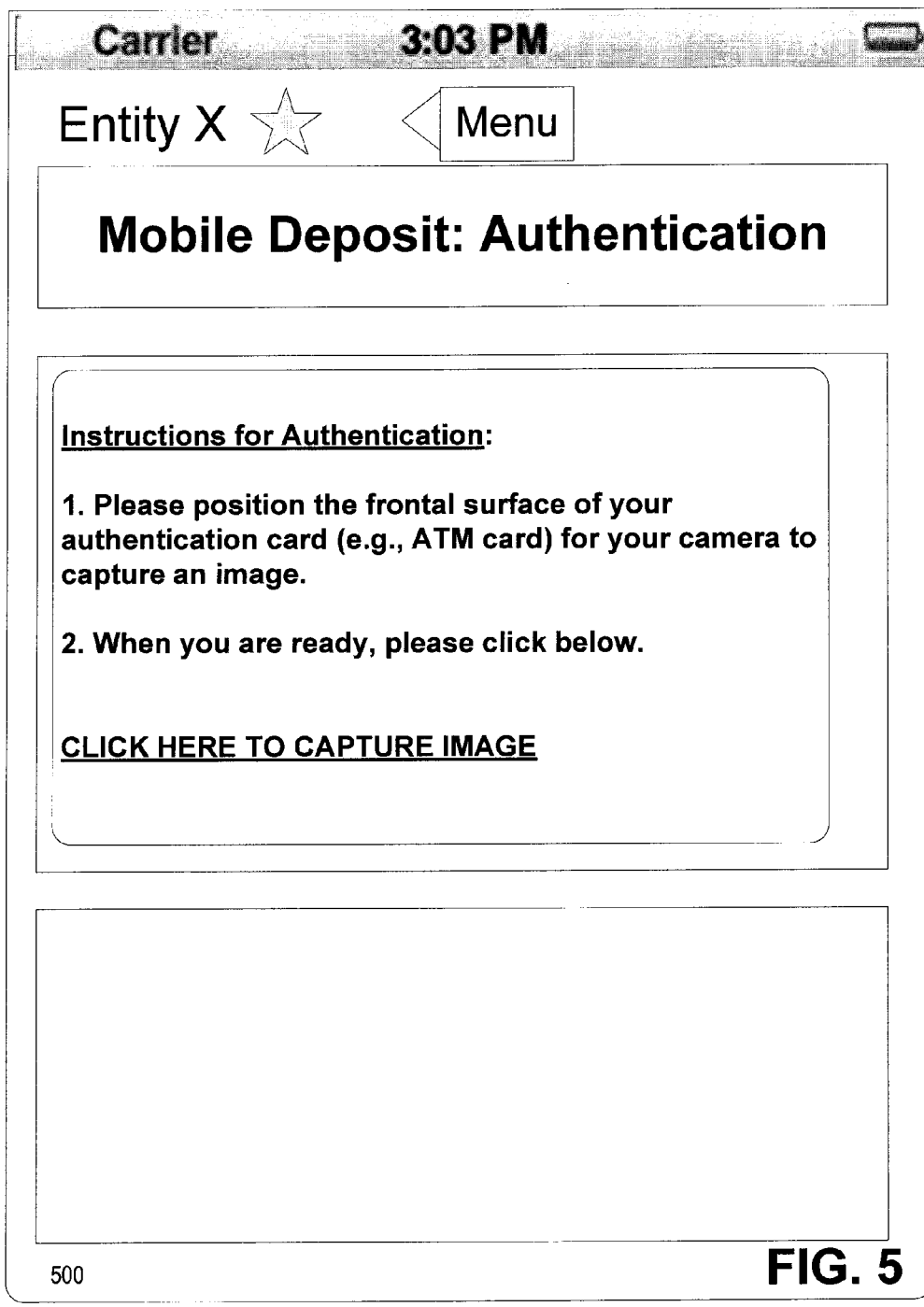

Referring now to FIG. 5, the apparatus indicates to the user the steps for authenticating the user to access a financial institution service (e.g., the mobile deposit service). Therefore, when a user selects the 'Mobile Deposit Service' option of FIG. 4, the apparatus displays the screenshot 500 presented in FIG. 5. Here, the apparatus directs the user to position the front surface of the user's capturable authentication card (e.g., ATM card) so that the image capture device may capture the image of the front surface of the capturable authentication card. In some embodiments, the apparatus may also display instructions to prompt the user to position the capturable authentication card on a flat surface, and/or position the capturable authentication card such that the image capture device is positioned orthogonally with respect to the capturable authentication card, and/or position the capturable authentication card such that all four corners of the capturable authentication card are captured, and/or position the capturable authentication card such that the front surface of the capturable authentication card is illuminated by adequate lighting, etc. The apparatus may also provide a selectable option to capture the image (Click Here to Capture Image') when the user is ready to capture the image of the front surface of the capturable authentication card. In some embodiments, after an image of the frontal surface of the capturable authentication card is captured, the apparatus may direct the user to initiate capture of an image of the back surface of the capturable authentication card as well. In such embodiments, the apparatus may present a screenshot similar to 500 that directs the user to position the back surface of the user's capturable authentication card so that the image capture device may capture the image of the back surface of the capturable authentication card. The apparatus may also provide a selectable option to capture the image of the back surface of the capturable authentication card whenever the user is ready to capture the image of the back surface of the capturable authentication card.

Figure 6:
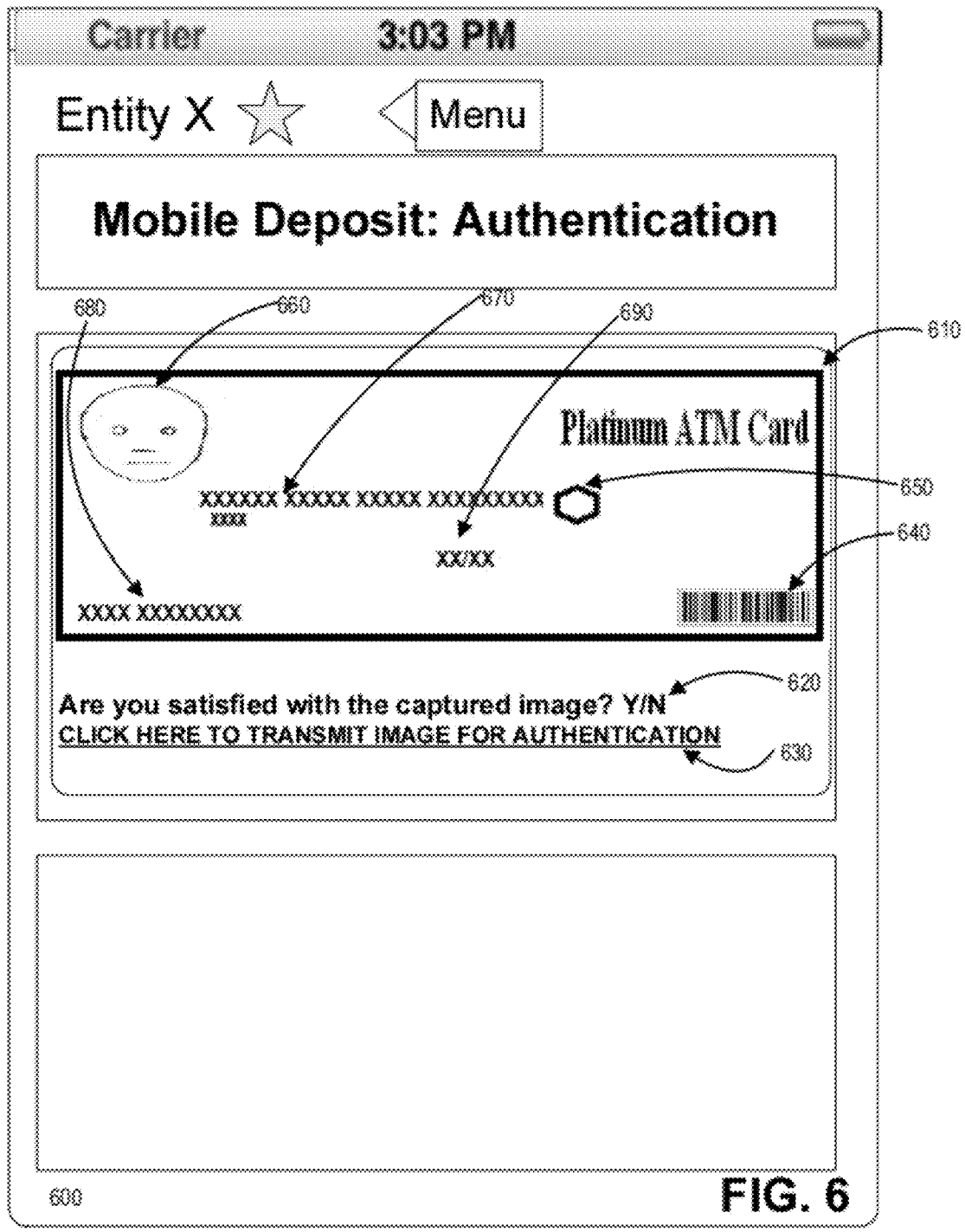

Referring now to FIG. 6, a screenshot 600 of the image capture device is depicted. In this screenshot, a display associated with the image capture device presents an image 610 of the front surface of the capturable authentication card that is captured by the image capture device. The image includes several parts. In some embodiments, the image includes the name 680 of the account holder associated with the account and/or the capturable authentication card. In some embodiments, the image includes a picture 660 of the account holder. In some embodiments, the image includes the account number 670 associated with the account and/or capturable authentication card. In some embodiments, the image includes the expiration date 690 associated with the capturable authentication card. In some embodiments, the expiration date is the date the capturable authentication card becomes disassociated from the account. In some embodiments, the symbol 650 indicates that the capturable authentication card is of a type eligible to make one or more transactions or use one or more financial institution services. In some embodiments, the image includes an authentication code 640. In some embodiments, this authentication code is a barcode as shown in FIG. 6. As explained previously, in other embodiments, this authentication code may take some other visible or invisible form. In some embodiments, the image may also include a signature associated with the account holder (not shown in FIG. 6). In other embodiments where an image of the signature of the account holder is present on the back surface of the capturable authentication card, and where the signature is required to authenticate the image capture device user to use a financial institution service, the image capture device allows the user to initiate capture of an image of the back surface of the capturable authentication card which is presented on the display associated with the image capture device. In some embodiments, the authentication code may be alternatively present on the back surface of the capturable authentication card instead of being present on the front surface of the capturable authentication card. In other embodiments, the authentication code may be present on the back surface of the capturable authentication card in addition to being present on the front surface of the card.

Figure 7:
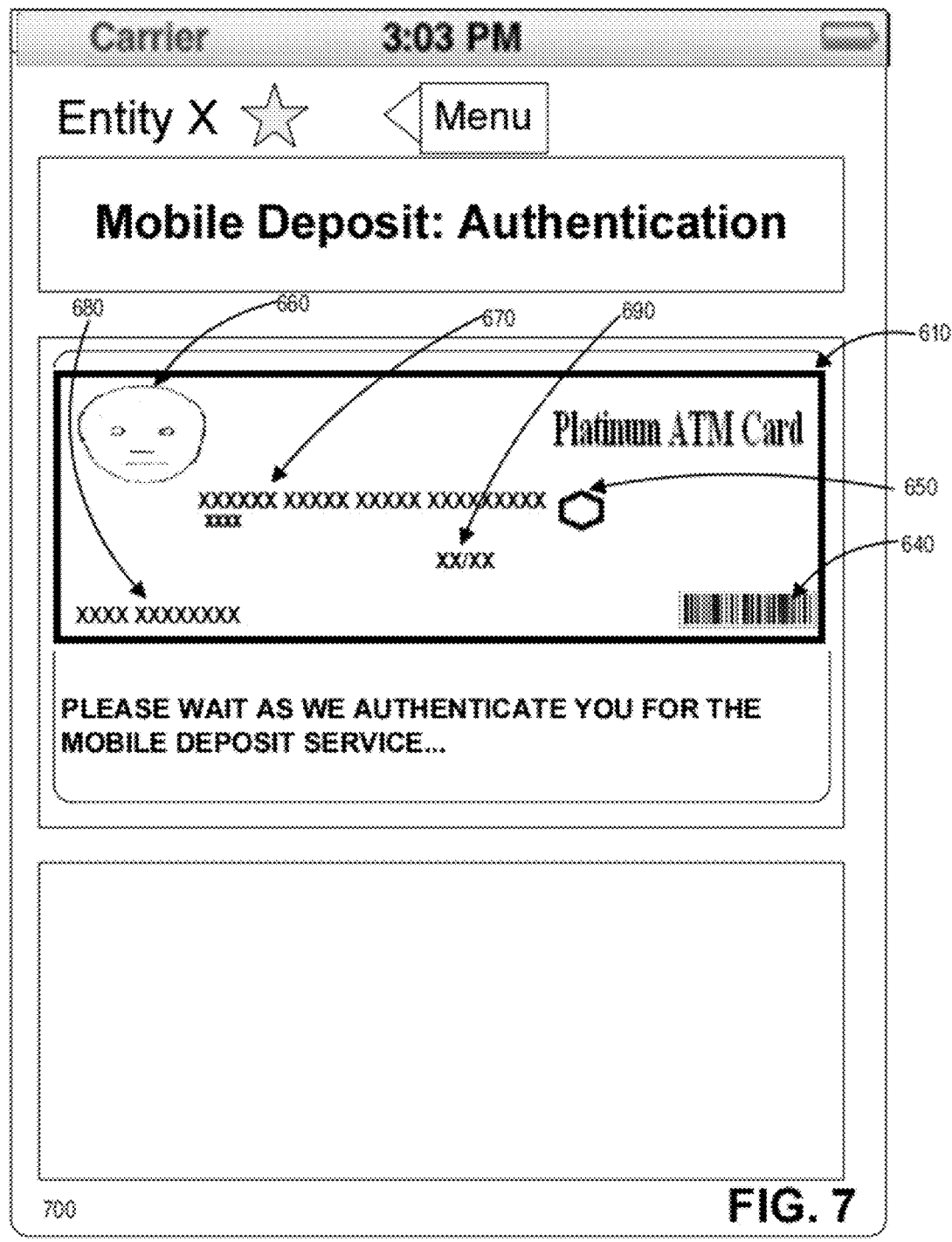

Referring now to FIG. 7, FIG. 7 represents a screenshot 700 of the image capture device where the apparatus provides an indication to the user that the apparatus is processing the user's request to access a service option. In some embodiments where the apparatus authenticates, in real-time, the user's request to access the service option, the apparatus may not display this screenshot.

Figure 8:
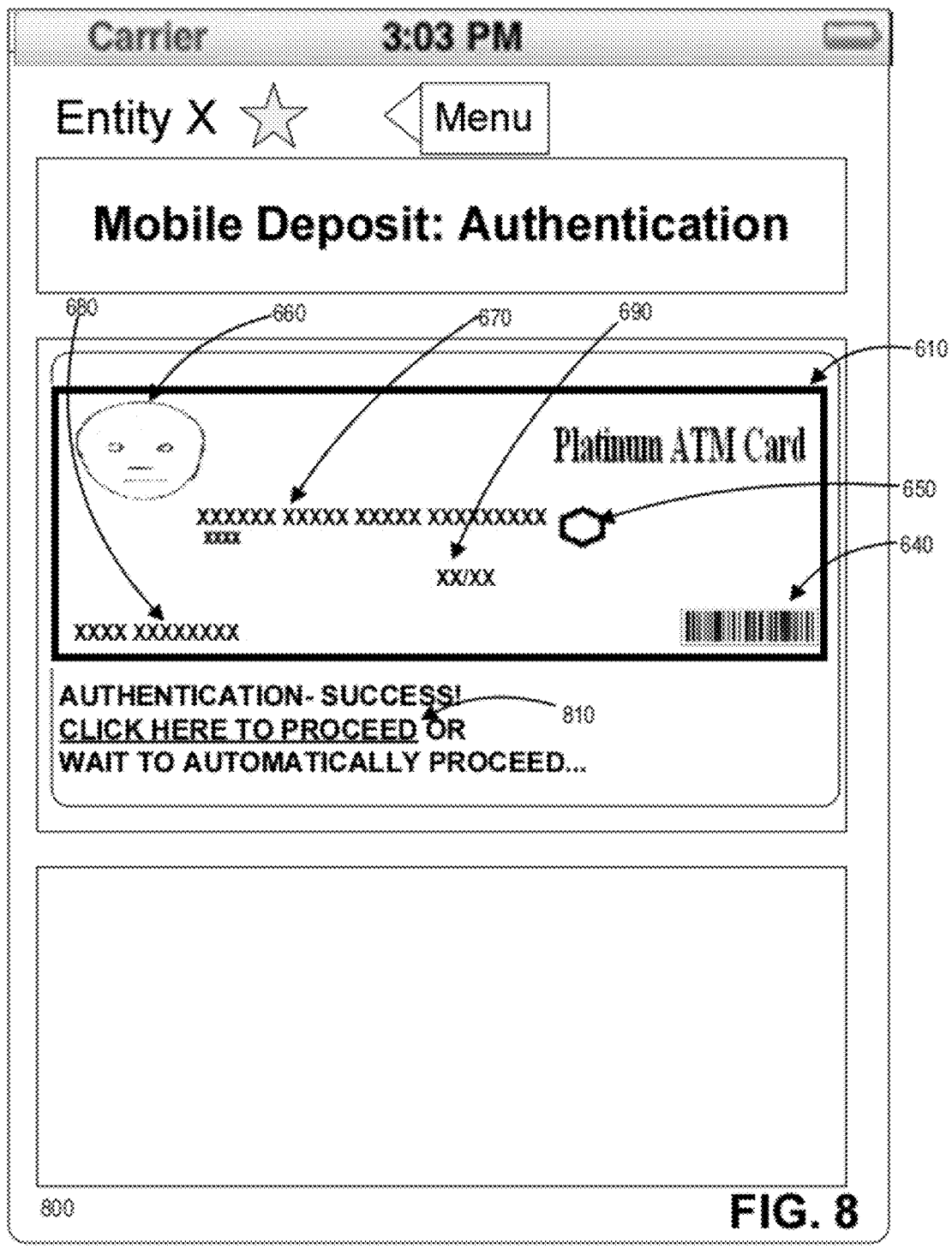

Referring now to FIG. 8, FIG. 8 represents a screenshot 800 of the image capture device where the apparatus provides an indication to the image capture device user that the user has been successfully authenticated to use the financial institution service. Additionally, the apparatus provides the user with a selectable option (e.g., "Click here to proceed") to proceed to the service option (e.g., mobile deposit service) selected by the user. Alternatively, the apparatus may not select the selectable option, and in such an instance, the apparatus automatically proceeds to the service option selected by the user.

Referring now to FIG. 9, FIG. 9 represents a screenshot 900 where the apparatus prompts a user to enter a passcode associated with the capturable authentication card. In some embodiments, this passcode may be associated with the account rather than the capturable authentication card. In some embodiments, this passcode is a personal identification number (PIN). This second level of authentication may be presented to mirror the authentication procedure associated with a physical ATM. Therefore, the passcode that the user inputs at 910 may be the same passcode that a user would input at a physical ATM. The processing of the passcode may represent the second level of authentication in authenticating a user to access a service option. In other embodiments, there may be more than two levels of authentication in order for a user to access a service option offered by an electronic banking environment. For example, the transaction apparatus may validate the received passcode, and may subsequently initiate presentation of "challenge questions" that prompt the user to input answers to these questions.

Referring now to FIG. 10, FIG. 10 represents a screenshot 1000. In some embodiments, the apparatus presents screenshot 1000 after the apparatus determines that the apparatus cannot authenticate the user to access the service option based at least partially on information obtained from the image 610 that was transmitted from the image capture device to the apparatus. In other embodiments, the apparatus presents screenshot 1000 after the apparatus determines that the apparatus cannot authenticate the user to access the service option based at least partially on the passcode entered at 910 in FIG. 9. In some embodiments, the apparatus presents a message indicating to the user that the user's authentication attempt has failed. In some embodiments, the apparatus provides the user with an option to execute another authentication attempt. Therefore, the user may choose to either a) enter the passcode again or b) capture another image of the capturable authentication card and subsequently enter the passcode again. In some embodiments, the apparatus provides the user with an option to return to the main menu, e.g., the screenshot presented in FIG. 3. The apparatus may also indicate to the user that the user is allowed a predetermined number of failed authentication attempts, and if the user attempts to access a service option after a predetermined number of failed authentication attempts, the apparatus may lock the user's account (and/or deactivate the capturable authentication card) for a predetermined period of time. In some embodiments, the account may become unlocked (and/or the capturable authentication card may be reactivated) after the expiration of a predetermined period of time, while in other embodiments, the user may need to perform a positive action (e.g., call the entity that hosts the account) in order unlock the account and/or reactivate the capturable authentication card.

Referring now to FIG. 11, a system 1100 is provided for authenticating access to a financial institution service, in accordance with embodiments of the present invention. In this example, the financial institution service is a mobile deposit service. As used herein, a mobile deposit service allows a user to make deposits of deposit items via an image capture device. In other embodiments, the financial institution service may be any other transactional service. As illustrated, the exemplary system 1100 includes a network 1110, an image capture device 1120, and a transaction apparatus 1130. Also shown are an image capture device user 1105, an image 1107 that shows the deposit item, which in the presented embodiment is a check 1101, and an image 1197 that shows an image of a capturable authentication card 1181 associated with banking account 1109. It will be understood that the check 1101 includes the deposit amount 1111 of $25, and that the check 1101 also includes deposit item information that is not shown (e.g., information associated with a payee identity, an account number, a MICR line, etc.). Also, it will be understood that the image capture device user 1105 has access to the image capture device 1120 and to the check 1101.

In some embodiments, the user 1105 can view, receive, generate, create, acquire, and/or capture the images 1107 and 1197 by using the image capture device 1120. In other embodiments, the image capture device 1120 views, receives, generates, and/or captures the image 1107 automatically (e.g., without the user's 1105 intervention). In addition, in some embodiments, the image capture device 1120 is exposed to and/or located proximately to the check 1101 when the image 1107 is viewed, received, generated, and/or captured by the image capture device 1120. In addition, in some embodiments, the image capture device 1120 is exposed to and/or located proximately to the capturable authentication card 1181 when the image 1197 is viewed, received, generated, and/or captured by the image capture device 1120. Also, in accordance with some embodiments, the image capture device 1120 is located remotely from the transaction apparatus 1130.

In addition, it will be understood that, in this example embodiment, the user 1105 intends to deposit the sum of the deposit amount 1111 (i.e., $25) into the banking account 1109. Also, the banking account 1109 is held by the user 1105 and is maintained by a bank or financial institution (not shown) for the benefit of that user 1105, who is a customer of that bank or financial institution. Still further, it will be understood that, in this example embodiment, the image capture device 1120 is maintained by the image capture device user 1105, and that the transaction apparatus 1130 is maintained by the same bank that maintains the banking account 1109. In another embodiment, the banking account may be any other type of banking account (e.g., a credit account) associated with the financial institution.

As shown in FIG. 11, the image capture device 1120 and the transaction apparatus 1130 are each operatively and selectively connected to the network 1110, which may include one or more separate networks. In addition, the network 1110 may include one or more interbank networks, telephone networks, telecommunication networks, satellite networks, local area networks (LANs), wide area networks (WANs), and/or global area networks (GANs) (e.g., the Internet, etc.). It will also be understood that the network 1110 may be secure and/or unsecure and may also include wireless and/or wireline technology.

The image capture device 1120 can include any image capture device described and/or contemplated herein. In addition, the image capture device 1120 can initiate, execute, complete, and/or otherwise facilitate any one or more portions of any embodiment described and/or contemplated herein. In some embodiments, the image capture device 1120 includes one or more mobile phones, gaming devices, digital cameras, flatbed scanners, tablet computers, and/or the like. As illustrated in FIG. 11, the image capture device 1120 includes a communication interface 1122, a processor 1124, a memory 1126 having an image capture application 1127 stored therein, an image capture device 1128, a user interface 1129, a location-determining system device 1131, etc. In such embodiments, the processor 1124 is operatively and selectively connected to the communication interface 1122, the user interface 1129, the image capture device 1128, the memory 1126, and the location-determining system device 1131.

Each communication interface described herein, including the communication interface 1122, generally includes hardware, and, in some instances, software, that enables a portion of the system 1100, such as the image capture device 1120, to send, receive, and/or otherwise communicate information to and/or from the communication interface of one or more other portions of the system 1100. For example, the communication interface 1122 of the image capture device 1120 may include a modem, network interface controller (NIC), network adapter, network interface card, and/or some other electronic communication device that operatively connects the image capture device 1120 to another portion of the system 1100, such as, for example, the transaction apparatus 1130.

Each processor described herein, including the processor 1124, generally includes circuitry for implementing the audio, visual, and/or logic functions of that portion of the system 1100. For example, the processor may include a digital signal processor device, a microprocessor device, and/or various analog-to-digital converters, digital-to-analog converters, and/or other support circuits. Control and signal processing functions of the apparatus in which the processor resides may be allocated between these one or more devices according to their respective capabilities. The processor may also include functionality to operate one or more software programs based at least partially on computer-executable program code portions thereof, which may be stored, for example, in a memory device, such as in the image capture application 1127 of the memory 1126 of the image capture device 1120.

Each memory device described herein, including the memory 1126 for storing the image capture application 1127 and/or other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus. The memory may be non-transitory or transitory.

As shown in FIG. 11, the memory 1126 includes the image capture application 1127. The image capture application 1127 may instruct and/or cause the processor 1124 (and/or one or more other portions of the image capture device 1120) to perform any one or more of the functions described herein as being performed by "an image capture device," by the image capture device 1120, and/or by the image capture application 1127. Additionally or alternatively, the image capture application 1127 can be executable to initiate, execute, complete, and/or otherwise facilitate any one or more portions of any embodiment described and/or contemplated herein, such as, for example, any one or more portions of the process flows 100 or 200 described herein. Additionally or alternatively, the image capture application 1127 may be configured to perform one or more portions of the process flow executed by the deposit application 1137 or the authentication application 1139.

For example, in some embodiments, the image capture application 1127 is executable to receive and/or generate an image (e.g., the image 1197 or the image 1107, etc.) that shows a capturable authentication card 1181 or a deposit item (e.g., the check 1101, etc.). In some embodiments, the image capture application 1127 is executable to determine, automatically or otherwise, whether an image (e.g., the image 1197 or the image 1107, etc.) is satisfactory (e.g., passes a minimum threshold of clarity) for reading one or more pieces of information (e.g., authentication code and/or image of account holder) from the image of the capturable authentication card 1181, reading deposit item information from the image (e.g., the deposit amount 1111 of $25, etc.). In still other embodiments, the image capture application 1127 is executable to perform, automatically or otherwise, any one or more of the actions represented by blocks of process flow 100 or 200. As another example, in some embodiments, the image capture application 1127 is executable to automatically capture an image of a capturable authentication card or a deposit item using the image capture device 1128, or prompt a user to initiate a process to capture an image of a capturable authentication card or a deposit item using the image capture device, and to determine whether the image of the capturable authentication card or deposit item is satisfactory in order to obtain data from the capturable authentication card or deposit item.

It will also be understood that, in some embodiments, the image capture application 1127 is executable to enable the image capture device user 1105 and/or the image capture device 1120 to communicate with one or more other portions of the system 1100, and/or vice versa. Further it will be understood that, in some embodiments, the image capture application 1127 is created, provided, controlled, and/or maintained by the bank that maintains the transaction apparatus 1130 and/or by an individual or business (not shown). For example, in some embodiments, the image capture device 1120 is embodied as a mobile computing device, and the image capture application 1127 is embodied as an "app" that was created by a bank and/or by a software maker for execution on the mobile computing device. Also, it will be understood that, in some embodiments, the image capture application 1127 includes one or more computer-executable program code portions for instructing the processor 1124 to perform one or more of the functions of the image capture application 1127 and/or of the image capture device 1120 described and/or contemplated herein. In some embodiments, the image capture application 1127 may include and/or use one or more network and/or system communication protocols.

Also shown in FIG. 11 is the image capture device 1128, which may include one or more cameras (e.g., digital or otherwise, etc.), charge coupled devices (CCD), complementary metal-oxide-semiconductor (CMOS) sensors, image sensors, and/or the like, including any one or more of the image capture devices described and/or contemplated herein. The image capture device 1128 may include one or more different types of image capture devices. In some embodiments, the image capture device 1128 is configured to receive, detect, recognize, and/or capture optical light, ultraviolet light, and/or infrared light. In some embodiments, the image capture device 1128 can be configured to view, receive, acquire, generate, create, and/or capture one or more still images and/or videos. In some embodiments, the image capture device 1128 is configured to communicate one or more generated and/or captured images to the processor 1124. Additionally or alternatively, in some embodiments, the image capture device 1128 includes one or more features, including, but not limited to, a zoom, focus, flash, lens, shutter, viewfinder, and/or the like. In some embodiments, the image capture device 1128 has a resolving power, which, for example, defines the detail and/or resolution with which an image can be generated and/or captured by the image capture device 1128.

In some embodiments, the resolving power associated with the image capture device 1128 is measured in the number of pixel sensors (sometimes referred to merely as "pixels") used by the image capture device 1128 in order to capture the image. In some embodiments, the image capture device 1128 is housed in the image capture device 1120. However, in other embodiments, the image capture device 1128 is operatively connected to the image capture device 1120 but is not housed in the image capture device 1120; instead, in such embodiments, the image capture device 1128 is located adjacent, near, within arm's reach, and/or otherwise proximate to the image capture device 1120 (e.g., a peripheral digital camera plugged into a mobile phone, etc.).

It will also be understood that the image capture device 1120 also includes the user interface 1129. It will be understood that the user interface 1129 (and any other user interface described and/or contemplated herein) can include and/or be embodied as one or more user interfaces. In some embodiments, the user interface 1129 includes one or more user output devices for presenting (e.g., communicating, rendering, displaying, outputting, etc.) information to the user 1105, such as, for example, one or more displays, speakers, and/or the like. In some embodiments, the user interface 1129 additionally or alternatively includes one or more user output devices for presenting information to the image capture device user 1105. In some embodiments, the user interface 1129 additionally or alternatively includes one or more user input devices, such as, for example, one or more buttons, keys, dials, levers, directional pads, joysticks, keyboards, mouses, accelerometers, controllers, microphones, touchpads, touchscreens, haptic interfaces, scanners, biometric readers, motion detectors, cameras, and/or the like for receiving information from one or more items (e.g., the capturable authentication card 1181, the check 1101, etc.) and/or the image capture device user 1105. In some embodiments, the user interface 1129 is housed in the image capture device 1120. However, in other embodiments, the user interface 1129 is operatively connected to the image capture device 1120 but is not housed in the image capture device 1120; instead, in such embodiments, the user interface 1129 is located adjacent, near, within arm's reach, and/or otherwise proximate to the image capture device 1120 (e.g., a peripheral touchscreen display plugged into a digital camera, etc.).

In some embodiments, the image capture device 1120 includes a location-determining system device 1131 that is configured to be used by the transaction apparatus 1130 to determine a location associated with the image capture device 1120. For example, the location-determining system device 1131 may include a global positioning system (GPS) transceiver that communicates with a GPS satellite. The transaction apparatus 1130 may be able to receive GPS coordinates associated with the image capture device by communicating with the GPS satellite.

In some embodiments, the location-determining system device 1131 is at least partially made up of an antenna, a transmitter, and a receiver. In some embodiments, triangulation of cellular signals may be used to identify the approximate location of the image capture device 1120. For instance, the transaction apparatus 1130 may be able to identify a cell site, e.g., cell tower that is located close to or closest to the image capture device 1120. As a further instance, the transaction apparatus 1130 may be able to identify a cell site that is communicating with the image capture device 1120, even though the cell site is not the closest cell site to the image capture device 1120.

In other embodiments, the location-determining system device 1131 includes a proximity sensor or transmitter, such as an RFID tag, that can sense or be sensed by devices known to be located proximate a merchant or other location to determine that the image capture device 1120 is located proximate these devices. The transaction apparatus 1130 may then communicate with these devices to determine the location of the image capture device 1120.

In some embodiments where the image capture device 1120 is on a network, the transaction apparatus 1130 can identify or receive a network address associated with the image capture device 1120. In some embodiments, the transaction apparatus 1130 may receive the network address by either 'pinging' the image capture device or some other system on the network that retains information about one or more devices on the network. In some embodiments, the network address is an Internet Protocol (IP) address.

FIG. 11 also illustrates the transaction apparatus 1130. In some embodiments, the transaction apparatus 1130 may include one or more servers, mainframes, engines, network devices, front end systems, back end systems, and/or the like. In some embodiments, such as the one illustrated in FIG. 11, the transaction apparatus 1130 includes a communication interface 1132, a processor 1134, and a memory 1136, which includes a deposit application 1137, an authentication application 1139, and an account datastore 1138 stored therein. As shown, the communication interface 1132 is operatively connected to the processor 1134, which is operatively connected to the memory 1136.

The authentication application 1139 may instruct and/or cause the processor 1134 (and/or one or more other portions of the transaction apparatus 1130) to perform any one or more of the functions described herein as being performed by the transaction apparatus 1130, and/or by the authentication application 1139. Additionally or alternatively, the authentication application 1139 can be executable to initiate, execute, complete, and/or otherwise facilitate any one or more portions of any embodiment described and/or contemplated herein, such as, for example, any one or more portions of the process flow 100 or 200 described herein. In some embodiments, the authentication application 1139 is stored in the image capture device 1120 and is executed by the processor 1124 associated with the image capture device 1120.

For example, in some embodiments, the authentication application 1139 is executable to receive a user input configured to request access to the financial institution service. As another example, in some embodiments, the authentication application 1139 is additionally or alternatively executable to initiate presentation of, using a processor, a first authentication request in an electronic banking environment, wherein the first authentication request prompts a user to initiate capture of an image of a capturable authentication card associated with the account holder (or the account). As another example, in some embodiments, the authentication application 1139 is additionally or alternatively executable to perform the initiation of the presentation of a first authentication request in an electronic banking environment, in substantially real-time upon occurrence of a triggering event. In some embodiments, this may mean that the initiation of the presentation is performed instantly upon initiation of an electronic banking application (or upon selection of a financial institution service option in an electronic banking application or upon receiving an image of the capturable authentication card). In other embodiments, this may mean that the initiation of the presentation is performed within a short period, e.g., few seconds (e.g., thirty seconds) or few minutes (e.g., two or three minutes) after initiation of an electronic banking application (or upon selection of a financial institution service option in an electronic banking application or upon receiving an image of the capturable authentication card).

Additionally, in some embodiments, the authentication application 1139 is additionally or alternatively executable to receive the image of the capturable authentication card transmitted from an image capture device. As another example, the authentication application 1139 is additionally or alternatively executable to determine the capturable authentication card is a valid capturable authentication card. In some embodiments, the authentication application 1139 is additionally or alternatively executable to perform capturable authentication card validation in substantially real-time upon occurrence of a triggering event. In some embodiments, this may mean that the validation determination is performed instantly upon receiving an image of the capturable authentication card. In other embodiments, this may mean that the validation determination is performed within a short period, e.g., few seconds (e.g., thirty seconds) or few minutes (e.g., two or three minutes) after receiving an image of the capturable authentication card.

In response to determining the capturable authentication card is valid, the authentication application 1139 is additionally or alternatively executable to initiate presentation of a second authentication request in the electronic banking environment, where the second authentication request prompts the user to enter a passcode associated with the capturable authentication card or associated with the account. As another example, the authentication application 1139 is additionally or alternatively executable to, in response to determining the capturable authentication card is not a valid capturable authentication card, initiate presentation of a rejection message in the electronic banking environment. As another example, the authentication application 1139 is additionally or alternatively executable to determine the capturable authentication card is an eligible capturable authentication card, where determining the capturable authentication card is an eligible capturable authentication card includes determining the capturable authentication card is of a type eligible to use the financial institution service.

In some embodiments, the authentication application 1139 is additionally or alternatively executable to, in response to receiving a request to access a financial institution service associated with an electronic banking environment, receive information associated with the account, and compare the information associated with the account to the information extracted from the image of the capturable authentication card. In alternate embodiments, the authentication application 1139 is additionally or alternatively executable to, in response to receiving the image of the capturable authentication card, receive information associated with the account, and compare the information associated with the account to the information extracted from the image of the capturable authentication card. In some embodiments, the authentication application 1139 is additionally or alternatively executable to determine that the capturable authentication card is valid if the account information received from the account datastore is consistent with information extracted from the capturable authentication card. As used herein, the term "consistent" means that the authentication application's 1139 comparison indicates that a user of the image capture device is the account holder (or is operating under the authority of the account holder).

In some embodiments, the authentication application 1139 is additionally or alternatively executable to determine one or more account identifiers from the image of the capturable authentication card, where the one or more account identifiers include a capturable authentication card number, an expiration date, a capturable authentication card type, a name associated with the capturable authentication card, a security code, etc. In some embodiments, the authentication application 1139 is additionally or alternatively executable to determine an authentication code from the image, and that the authentication code matches one of a plurality of authentication codes stored in a code repository that is part of the account datastore 1138. In some embodiments, the authentication application 1139 is additionally or alternatively executable to determine an authentication code from the image, and that the authentication code is associated with the one or more account identifiers associated with the account. In some embodiments, the authentication application 1139 is additionally or alternatively executable to determine an authentication code from the image, and process the authentication code to determine the authentication code is a valid authentication code. As described previously, in some embodiments the authentication code is a barcode or other visually-perceptible code. In other embodiments, the authentication code may be a string comprising alphanumeric characters, symbols, graphics, or any combination thereof. In still other embodiments, the authentication code is not visible on the image, but the authentication application 1139 is additionally or alternatively executable to derive or generate the code from the image by performing one or more operations using the one or more account identifiers determined from the image.

In some embodiments, the authentication application 1139 is additionally or alternatively executable to identify an image of the account holder from the image of the capturable authentication card, and determine the image of the account holder substantially matches an image of the account holder stored in an image repository (the image repository may be part of the account datastore 1138). In some embodiments, the authentication application 1139 is additionally or alternatively executable to identify an image of the account holder from the image of the capturable authentication card, and determine the image of the account holder is associated with the one or more account identifiers associated with the account. In some embodiments, the authentication application 1139 is additionally or alternatively executable to determine the image of the account holder is associated with the authentication code. In some embodiments, the authentication application 1139 is additionally or alternatively executable to identify an image of the account holder from the image of the capturable authentication card, initiate presentation of a request prompting a user to initiate capture of an image of the user, receive a captured image of the user, and determine the image of the account holder substantially matches the captured image of the user. In some embodiments, the authentication application 1139 is additionally or alternatively executable to identify a signature of the account holder from the image of the capturable authentication card, initiate presentation of a request prompting a user to input a signature of the user, receive the user's signature, and determine the signature of the account holder substantially matches the signature of the user. In some embodiments, the authentication application 1139 is additionally or alternatively executable to, in response to determining the capturable authentication card is a valid capturable authentication card, initiate the financial institution service in the electronic banking environment. In some embodiments, the authentication application 1139 is additionally or alternatively executable to, in response to receiving the passcode and verifying that the passcode is correct, initiate the financial institution service in the electronic banking environment.

In some embodiments, the authentication application 1139 is additionally or alternatively executable to receive a user input configured to request access to a financial institution service, and initiate presentation of, using a processor, a first authentication request in an electronic banking environment, wherein the first authentication request prompts a user to initiate capture of an image of an object associated with the user. In some embodiments, the authentication application 1139 is additionally or alternatively executable to receive the image of the object, and authenticate the user based at least partially on information extracted from the image of the object.

As used above with respect to the authentication application 1139, the electronic banking environment may be a graphical user interface that presents information associated with the account 1109. The account may be an electronic banking account (e.g., online banking account, mobile banking account, text banking account, etc.). In some embodiments, the financial institution service as used above with respect to the authentication application 1139 is a service that allows a user of the account to deposit a deposit item via an image capture device 1120 into the account. In some embodiments, the deposit item is a check 1101.

In some embodiments, the authentication application 1139 can be configured to perform one or more of the same functions previously described herein as being performed by the image capture application 1127 (and/or vice versa). In some embodiments, the authentication application 1139 can be configured to perform one or more of the same functions previously described herein as being performed by the deposit application 1137 (and/or vice versa). It will also be understood that, in some embodiments, the authentication application 1139 is configured to enable the transaction apparatus 1130 to communicate with one or more other portions of the system 1100, such as, for example, the account datastore 1138, the image capture device 1120, other internal or external databases or systems that carry the above-described financial institution data and non-financial institution data, and/or vice versa. In some embodiments, the authentication application 1139 includes one or more computer-executable program code portions for instructing the processor 1134 to perform one or more of the functions of the authentication application 1139 and/or transaction apparatus 1130 described and/or contemplated herein. In some embodiments, the authentication application 1139 may include and/or use one or more network and/or system communication protocols.

The deposit application 1137 may instruct and/or cause the processor 1134 (and/or one or more other portions of the transaction apparatus 1130) to perform any one or more of the functions described herein as being performed by "a deposit server," by the transaction apparatus 1130, and/or by the deposit application 1137. Additionally or alternatively, the deposit application 1137 can be executable to initiate, execute, complete, and/or otherwise facilitate any one or more portions of any embodiment described and/or contemplated herein, such as, for example, any one or more portions of the process flow 100 or 200 described herein. For example, in some embodiments, the deposit application 1137 is executable to receive an image that shows a deposit item (e.g., the image 1107 that shows the check 1101, etc.). As another example, in some embodiments, the deposit application 1137 is executable to read deposit item information (e.g., the deposit amount 1111, etc.) from a captured image. As another example, in some embodiments, the deposit application 1137 is additionally or alternatively executable to credit an account (e.g., the banking account 1109, etc.) based at least partially on the deposit item information associated with the deposit item. For example, in some embodiments, the deposit application 1137 is executable to transfer funds from a payor account identified in the deposit item information, in an amount identified in the deposit item information, and to a payee account identified in the deposit item information. In some embodiments, the deposit application 1137 can be configured to perform one or more of the same functions previously described herein as being performed by the image capture application 1127 (and/or vice versa).

The term "deposit," as used herein, generally refers to the process of depositing a deposit item (and/or the funds and/or credit corresponding thereto) into an account associated with the account holder. The phrase "deposit item," as used herein, generally refers to one or more checks (e.g., personal checks, business checks, cashier's checks, credit card convenience checks, certified checks, pay checks, traveler's checks, etc.), money orders, deposit slips, payment vouchers, and/or the like. In some embodiments, the "deposit item" refers to two or more deposit items and/or to two or more different types of deposit items.

It will also be understood that, in some embodiments, the deposit application 1137 is configured to enable the transaction apparatus 1130 to communicate with one or more other portions of the system 1100, such as, for example, the account datastore 1138 and/or the image capture device 1120, and/or vice versa. It will further be understood that, in some embodiments, the deposit application 1137 is configured to initiate, execute, complete, and/or otherwise facilitate one or more financial transactions and/or to maintain one or more financial accounts (e.g., the banking account 1109, etc.) stored in the account datastore 1138. In some embodiments, the deposit application 1137 includes one or more computer-executable program code portions for instructing the processor 1134 to perform one or more of the functions of the deposit application 1137 and/or transaction apparatus 1130 described and/or contemplated herein. In some embodiments, the deposit application 1137 may include and/or use one or more network and/or system communication protocols.

In addition to the deposit application 1137, the memory 1136 also includes the account datastore 1138. It will be understood that the account datastore 1138 can be configured to store any type and/or amount of information. For example, in some embodiments, the account datastore 1138 includes information associated with one or more transactions, accounts, users or account holders, and/or the like. In some embodiments, the information stored in the account datastore 1138 may include the above-described information that is received at block 110 of FIG. 1. For example, information associated with an account may include an account number, a capturable authentication card number, a capturable authentication card expiration date, one or more names associated with the account, one or more security codes associated with the capturable authentication card, a capturable authentication card type, rules and regulations (e.g., credit limits, withdrawal limits, usage limits, transaction limits, etc.) associated with the capturable authentication card and/or an account, one or more authentication codes associated with the capturable authentication card (e.g., barcode) or account (e.g., passcode), previously captured images associated with the capturable authentication card (e.g., front and back images of the entire card, or an image of an authentication code on the capturable authentication card (e.g., barcode) or the account holder (e.g., frontal and/or side views of account holder's face). In some embodiments, the account datastore 1138 may also store any information related to processing images captured by image capture devices. In some embodiments, the account datastore 1138 additionally or alternatively stores information associated with electronic financial institution services.

Also, the account datastore 1138 may include any one or more storage devices, including, but not limited to, datastores, data repositories, databases, and/or any of the other storage devices typically associated with a computer system. It will also be understood that the account datastore 1138 may store information in any known way, such as, for example, by using one or more computer codes and/or languages, alphanumeric character strings, data sets, figures, tables, charts, links, documents, and/or the like. Further, in some embodiments, the account datastore 1138 may include information associated with one or more applications, such as, for example, the deposit application 1137 or the authentication application 1139. It will also be understood that, in some embodiments, the account datastore 1138 provides a real-time or substantially real-time representation of the information stored therein, so that, for example, when the processor 1134 accesses the account datastore 1138, the information stored therein is current or nearly current. The account datastore 1138 can also dynamically store information, such that the information stored therein (e.g., account balances, transaction information, rules for depositing checks, etc.) can be quickly added, removed, changed, revised, updated, and/or the like.

Of course, it will be understood that the embodiment of the system 1100 illustrated in FIG. 11 is exemplary and that other embodiments may vary. For example, in some embodiments, some or all of the portions of the system 1100 are combined into a single portion. Specifically, in some embodiments, the image capture device 1120 and the transaction apparatus 1130 are combined into a single image capture and transaction device that is configured to perform all of the same functions of those separate portions as described and/or contemplated herein. Likewise, in some embodiments, some or all of the portions of the system 1100 are separated into two or more distinct portions. In addition, the various portions of the system 1100 may be maintained by the same or separate parties. For example, in some embodiments, a bank may maintain the transaction apparatus 1130, whereas the image capture device user 1105 may maintain the image capture device 1120. However, in other embodiments, a bank may maintain the transaction apparatus 1130 and the image capture device 1120.

It will also be understood that the system 1100 (and/or one or more portions of the system 1100) may include and/or implement any embodiment of the present invention described and/or contemplated herein. For example, in some embodiments, the system 1100 (and/or one or more portions of the system 1100) is configured to implement any one or more of the embodiments of the process flow 100 and/or 200 described and/or contemplated herein in connection with FIGS. 1 and 2.

In accordance with embodiments of the invention, the term "module" with respect to a system may refer to a hardware component of the system, a software component of the system, or a component of the system that includes both hardware and software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A portable mobile communication apparatus for authenticating access to a financial institution service associated with an account, the apparatus comprising:
    a camera;
    a memory;
    a processor; and
    a module stored in the memory, executable by the processor, and configured to:
        place a first phone call;
        receive a second phone call;
        receive a user input configured to request access to the financial institution service;
        initiate presentation of, using a processor, a first authentication request in an electronic banking environment, wherein the first authentication request prompts a user to initiate capture of an image of a capturable authentication card using the camera;
        receive the image of the capturable authentication card;
        initiate presentation of a request prompting the user to initiate capture of an image of the user;
        extract information from the image of the capturable authentication card, the extracted information comprising an image of an account holder associated with the account; and
        in response to receiving the image of the capturable authentication card, send, over a mobile communication interface, the extracted information and the captured image of the user to an external apparatus for use by the external apparatus to determine whether the image of the user substantially matches the image of the account holder.

2. The apparatus of claim 1, wherein the module is further configured to:
    determine the capturable authentication card is a valid capturable authentication card based at least partially on the information extracted from the image of the capturable authentication card.

3. The apparatus of claim 2, wherein the module is further configured to:
    initiate presentation of a second authentication request in the electronic banking environment, wherein the second authentication request prompts the user to enter a passcode associated with the capturable authentication card.

4. The apparatus of claim 2, wherein the capturable authentication card includes at least one of a payment card or an identification card.

5. The apparatus of claim 2, wherein the module is further configured to:
    in response to receiving the image of the capturable authentication card, receive information associated with the account; and
    compare the information associated with the account to the information extracted from the image of the capturable authentication card.

6. The apparatus of claim 2, wherein to determine the capturable authentication card is a valid capturable authentication card, the module is further configured to:
    determine the capturable authentication card is an eligible capturable authentication card, wherein determining the capturable authentication card is an eligible capturable authentication card comprises determining the capturable authentication card is of a type eligible to use the financial institution service.

7. The apparatus of claim 2, wherein to determine the capturable authentication card is a valid capturable authentication card, the module is further configured to:
    determine one or more account identifiers from the image, wherein the one or more account identifiers comprise a capturable authentication card number, an expiration date, a capturable authentication card type, a name associated with the capturable authentication card, and a security code.

8. The apparatus of claim 2, wherein to determine the capturable authentication card is a valid capturable authentication card, the module is further configured to:
    determine an authentication code from the image; and
    determine the authentication code matches one of a plurality of authentication codes stored in a code repository.

9. The apparatus of claim 7, wherein to determine the capturable authentication card is a valid capturable authentication card, the module is further configured to:
    determine an authentication code from the image; and
    determine the authentication code is associated with the one or more account identifiers associated with the account.

10. The apparatus of claim 2, wherein to determine the capturable authentication card is a valid capturable authentication card, the module is further configured to:
    determine an authentication code from the image; and
    process the authentication code to determine the authentication code is a valid authentication code.

11. The apparatus of claim 8, wherein the authentication code is a barcode.

12. The apparatus of claim 8, wherein the authentication code is a code comprising alphanumeric characters, symbols, graphics, or any combination thereof.

13. The apparatus of claim 8, wherein the authentication code is not visible on the image, but is instead derived from the module performing one or more operations using one or more account identifiers determined from the image of the capturable authentication card.

14. The apparatus of claim 2, wherein to determine the capturable authentication card is a valid capturable authentication card, the module is further configured to:
    identify an image of the account holder from the image of the capturable authentication card; and determine the image of the account holder substantially matches an image of the account holder stored in an image repository.

15. The apparatus of claim 7, wherein to determine the capturable authentication card is a valid capturable authentication card, the module is further configured to:
   identify an image of the account holder from the image of the capturable authentication card; and
   determine the image of the account holder is associated with the one or more account identifiers associated with the account.

16. The apparatus of claim 15, wherein the module is further configured to:
   determine an authentication code from the image of the capturable authentication card; and
   determine the image of the account holder is associated with the authentication code.

17. The apparatus of claim 2, wherein to determine the capturable authentication card is a valid capturable authentication card, the module is further configured to:
   identify a signature of the account holder from the image of the capturable authentication card;
   initiate presentation of a request prompting the user to input a signature of the user; and
   determine the signature of the account holder substantially matches the signature of the user.

18. The apparatus of claim 3, wherein the module is further configured to:
   in response to receiving the passcode and validating the passcode, initiate the financial institution service in the electronic banking environment.

19. The apparatus of claim 1, wherein the electronic banking environment comprises a mobile banking application.

* * * * *